(12) United States Patent
Tachibana et al.

(10) Patent No.: US 11,724,775 B1
(45) Date of Patent: Aug. 15, 2023

(54) CONTROL DEVICE AND DERAILLEUR FOR HUMAN-POWERED VEHICLE

(71) Applicant: SHIMANO INC., Sakai (JP)

(72) Inventors: Katsuhiro Tachibana, Sakai (JP); Yuichi Ueyama, Sakai (JP); Akihiro Nozaki, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/713,186

(22) Filed: Apr. 4, 2022

(51) Int. Cl.
  *B62M 25/08* (2006.01)
  *B62J 45/41* (2020.01)

(52) U.S. Cl.
  CPC ............ *B62M 25/08* (2013.01); *B62J 45/41* (2020.02)

(58) Field of Classification Search
  CPC ........ Y02T 10/70; Y02T 10/72; B62M 25/08; B62M 9/122
  USPC .............................................. 474/78, 80, 82
  See application file for complete search history.

(56) References Cited

U.S. PATENT DOCUMENTS

| | | | | |
|---|---|---|---|---|
| 7,311,322 B2* | 12/2007 | Kitamura | ............... | B62M 25/08 474/69 |
| 7,342,321 B2* | 3/2008 | Kitamura | ............... | B62M 25/08 290/1 R |
| 7,399,244 B2* | 7/2008 | Takebayashi | .......... | B62M 9/122 474/70 |
| 7,553,247 B2* | 6/2009 | Guderzo | ................ | B62M 9/122 474/70 |
| 11,459,061 B2* | 10/2022 | Ho | ......... | B62M 25/08 |
| 2006/0226879 A1* | 10/2006 | Kitamura | ................. | B62J 6/015 327/94 |
| 2015/0210354 A1* | 7/2015 | Kuroda | ................... | F16H 63/04 474/70 |
| 2018/0183255 A1* | 6/2018 | Shahana | ................... | B62J 3/10 |
| 2020/0223513 A1* | 7/2020 | Ho | ......... | B62M 9/122 |

FOREIGN PATENT DOCUMENTS

| | | |
|---|---|---|
| JP | 4141453 B2 | 9/2006 |
| JP | 2015-140039 | 8/2015 |
| JP | 6688726 B2 | 7/2018 |

\* cited by examiner

*Primary Examiner* — Henry Y Liu
(74) *Attorney, Agent, or Firm* — Mori & Ward, LLP

(57) ABSTRACT

A control device comprises a controller configured to control an actuator to move an output member in a first actuating manner in a first state where an electric power source configured to supply electricity to the actuator is in a first power-source state and where a movement of the output member does not reach a target movement after the controller controls the actuator based on control information. The controller is configured to control the actuator to move the output member in a second actuating manner different from the first actuating manner in a second state where the electric power source is in a second power-source state different from the first power-source state and where the movement of the output member does not reach the target movement after the controller controls the actuator based on the control information.

21 Claims, 25 Drawing Sheets

CONTROL DEVICE AND DERAILLEUR FOR HUMAN-POWERED VEHICLE

BACKGROUND

Technical Field

The present invention relates to a control device and a derailleur for a human-powered vehicle.

Background Information

A human-powered vehicle includes a control unit. The control unit is configured to control an actuating unit to move an output part. The control unit is powered by a power supply. For example, it is preferable to change power consumption of the actuating unit depending on the state of the power supply.

SUMMARY

In accordance with a first aspect of the present invention, a control device for a human-powered vehicle comprises a controller configured to control an actuator to move an output member based on control information. The controller is configured to control the actuator to move the output member in a first actuating manner in a first state where an electric power source configured to supply electricity to the actuator is in a first power-source state and where a movement of the output member does not reach a target movement after the controller controls the actuator based on the control information. The controller is configured to control the actuator to move the output member in a second actuating manner different from the first actuating manner in a second state where the electric power source is in a second power-source state different from the first power-source state and where the movement of the output member does not reach the target movement after the controller controls the actuator based on the control information.

With the control device according to the first aspect, it is possible to change an actuating manner of the actuator in a retry action depending on a state of the electric power source when the movement of the output member does not reach the target movement. Thus, it is possible to reduce power consumption of the actuator in the retry action depending on the state of the electric power source.

In accordance with a second aspect of the present invention, the control device according to the first aspect is configured so that the controller is configured to control the actuator to move the output member at first number of times during an actuating time period in the first state. The controller is configured to control the actuator to move the output member at second number of times different from the first number of times during the actuating time period in the second state.

With the control device according to the second aspect, it is possible to change a total number of times at which the actuator moves the output member in the retry action depending on the state of the electric power source. Thus, it is possible to reliably reduce power consumption of the actuator in the retry action depending on the state of the electric power source.

In accordance with a third aspect of the present invention, the control device according to the second aspect is configured so that the electric power source has a first remaining level if the electric power source is in the first power-source state. The electric power source has a second remaining level if the electric power source is in the second power-source state. The second remaining level is lower than the first remaining level. The second number of times is smaller than the first number of times.

With the control device according to the third aspect, it is possible to change the total number of times at which the actuator moves the output member in the retry action depending on a remaining level of the electric power source. The total number of times at which the actuator moves the output member in the retry action gets smaller when the remaining level of the electric power source is lower. Thus, it is possible to more reliably reduce power consumption of the actuator in the retry action depending on the state of the electric power source.

In accordance with a fourth aspect of the present invention, the control device according to the second or third aspect is configured so that the electric power source has a first capacity if the electric power source is in the first power-source state. The electric power source has a second capacity if the electric power source is in the second power-source state. The second capacity is smaller than the first capacity. The second number of times is smaller than the first number of times.

With the control device according to the fourth aspect, it is possible to change the total number of times at which the actuator moves the output member in the retry action depending on a capacity of the electric power source. The total number of times at which the actuator moves the output member in the retry action gets smaller when the capacity of the electric power source is smaller. Thus, it is possible to more reliably reduce power consumption of the actuator in the retry action depending on the state of the electric power source.

In accordance with a fifth aspect of the present invention, the control device according to any one of the second to fourth aspects is configured so that the actuating time period in the first state is equal to the actuating time period in the second state.

With the control device according to the fifth aspect, it is possible to change the total number of times at which the actuator moves the output member in the retry action per unit time.

In accordance with a sixth aspect of the present invention, the control device according to any one of the first to fourth aspects is configured so that the controller is configured to control the actuator to move the output member during a first actuating time period in the first state. The controller is configured to control the actuator to move the output member during a second actuating time period different from the first actuating time period in the second state.

With the control device according to the sixth aspect, it is possible to change an actuating time period of the actuator in the retry action depending on the state of the electric power source. Thus, it is possible to reliably reduce power consumption of the actuator in the retry action depending on the state of the electric power source.

In accordance with a seventh aspect of the present invention, the control device according to the sixth aspect is configured so that the electric power source has a first remaining level if the electric power source is in the first power-source state. The electric power source has a second remaining level if the electric power source is in the second power-source state. The second remaining level is lower than the first remaining level. The second actuating time period is shorter than the first actuating time period.

With the control device according to the seventh aspect, it is possible to change the actuating time period of the actuator in the retry action depending on the remaining level of the electric power source. Thus, it is possible to more reliably reduce power consumption of the actuator in the retry action depending on the state of the electric power source.

In accordance with an eighth aspect of the present invention, the control device according to the sixth or seventh aspect is configured so that the electric power source has a first capacity if the electric power source is in the first power-source state. The electric power source has a second capacity if the electric power source is in the second power-source state. The second capacity is smaller than the first capacity. The second actuating time period is shorter than the first actuating time period.

With the control device according to the eighth aspect, it is possible to change the actuating time period of the actuator in the retry action depending on the capacity of the electric power source. Thus, it is possible to more reliably reduce power consumption of the actuator in the retry action depending on the state of the electric power source.

In accordance with a ninth aspect of the present invention, the control device according to any one of the second to fourth and sixth to eighth aspects is configured so that the actuating time period includes a first actuating time period and a second actuating time period different from the first actuating time period. The controller is configured to control the actuator to move the output member at the first number of times during the first actuating time period in the first state. The controller is configured to control the actuator to move the output member at the second number of times during the second actuating time period in the second state.

With the control device according to the ninth aspect, it is possible to change a total number of times and an actuating time period of the actuator in the retry action depending on the state of the electric power source. Thus, it is possible to reliably reduce power consumption of the actuator in the retry action depending on the state of the electric power source.

In accordance with a tenth aspect of the present invention, the control device according to the ninth aspect is configured so that the electric power source has a first capacity if the electric power source is in the first power-source state. The electric power source has a second capacity if the electric power source is in the second power-source state. The second capacity is smaller than the first capacity. The second actuating time period is shorter than the first actuating time period.

With the control device according to the tenth aspect, it is possible to change the total number of times and the actuating time period of the actuator in the retry action depending on the capacity of the electric power source. Thus, it is possible to reliably reduce power consumption of the actuator in the retry action depending on the state of the electric power source.

In accordance with an eleventh aspect of the present invention, a control device for a human-powered vehicle comprises a controller configured to control an actuator to move an output member based on control information. The controller is configured to control the actuator to move the output member in a first actuating manner in a first actuator state where the control information indicates a first actuating direction of the actuator and where a movement of the output member does not reach a target movement after the controller controls the actuator based on the control information. The controller is configured to control the actuator to move the output member in a second actuating manner different from the first actuating manner in a second actuator state where the control information indicates a second actuating direction of the actuator different from the first actuating direction and where the movement of the output member does not reach the target movement after the controller controls the actuator based on the control information.

With the control device according to the eleventh aspect, it is possible to change an actuating manner of the actuator in a retry action depending on an actuating direction of the actuator when the movement of the output member does not reach the target movement. Different actuating directions may cause different power consumption of the actuator. Thus, it is possible to reduce power consumption of the actuator in the retry action depending on the actuating direction of the actuator.

In accordance with a twelfth aspect of the present invention, the control device according to the eleventh aspect is configured so that the controller is configured to control the actuator to move the output member at first number of times during an actuating time period in the first actuator state. The controller is configured to control the actuator to move the output member at second number of times different from the first number of times during the actuating time period in the second actuator state.

With the control device according to the twelfth aspect, it is possible to change a total number of times at which the actuator moves the output member in the retry action depending on the actuating direction of the actuator. Thus, it is possible to reliably reduce power consumption of the actuator in the retry action depending on the actuating direction of the actuator.

In accordance with a thirteenth aspect of the present invention, the control device according to the twelfth aspect is configured so that the first actuating direction is a direction in which power consumption of the actuator is first power consumption. The second actuating direction is a direction in which the power consumption of the actuator is second power consumption higher than the first power consumption. The second number of times is smaller than the first number of times.

With the control device according to the thirteenth aspect, it is possible to reduce the total number of times of the actuator in the retry action when the actuator moves the output member in the second actuating direction having the second power consumption higher than the first power consumption of the first actuating direction. Thus, it is possible to more reliably reduce power consumption of the actuator in the retry action depending on the actuating direction of the actuator.

In accordance with a fourteenth aspect of the present invention, the control device according to the twelfth or thirteenth aspect is configured so that the actuating time period in the first actuator state is equal to the actuating time period in the second actuator state.

With the control device according to the fourteenth aspect, it is possible to change the total number of times at which the actuator moves the output member in the retry action per unit time.

In accordance with a fifteenth aspect of the present invention, the control device according to the twelfth or thirteenth aspect is configured so that the actuating time period includes a first actuating time period and a second actuating time period different from the first actuating time period. The controller is configured to control the actuator to move the output member at the first number of times during the first actuating time period in the first actuator state. The controller is configured to control the actuator to move the output member at the second number of times during the second actuating time period in the second actuator state.

With the control device according to the fifteenth aspect, it is possible to change a total number of times and an actuating time period of the actuator in the retry action depending on the actuating direction of the actuator. Thus, it is possible to more reliably reduce power consumption of the actuator in the retry action depending on the actuating direction of the actuator.

In accordance with a sixteenth aspect of the present invention, the control device according to the fifteenth aspect is configured so that the first actuating direction is a direction in which power consumption of the actuator is first power consumption. The second actuating direction is a direction in which the power consumption of the actuator is second power consumption higher than the first power consumption. The second actuating time period is shorter than the first actuating time period.

With the control device according to the sixteenth aspect, it is possible to change the actuating time period of the actuator in the retry action depending on the actuating direction of the actuator. Thus, it is possible to more reliably reduce power consumption of the actuator in the retry action depending on the actuating direction of the actuator.

In accordance with a seventeenth aspect of the present invention, the control device according to any one of the eleventh to thirteenth, fifteenth and sixteenth aspects is configured so that the controller is configured to control the actuator to move the output member during a first actuating time period in the first actuator state. The controller is configured to control the actuator to move the output member during a second actuating time period different from the first actuating time period in the second actuator state.

With the control device according to the seventeenth aspect, it is possible to change an actuating time period of the actuator in the retry action depending on the actuating direction of the actuator. Thus, it is possible to reliably reduce power consumption of the actuator in the retry action depending on the actuating direction of the actuator.

In accordance with an eighteenth aspect of the present invention, the control device according to the seventeenth aspect is configured so that the first actuating direction is a direction in which power consumption of the actuator is first power consumption. The second actuating direction is a direction in which the power consumption of the actuator is second power consumption higher than the first power consumption. The second actuating time period is shorter than the first actuating time period.

With the control device according to the eighteenth aspect, it is possible to make the actuating time period of the actuator in the retry action shorter when the actuator moves the output member in the second actuating direction having the second power consumption higher than the first power consumption of the first actuating direction. Thus, it is possible to more reliably reduce power consumption of the actuator in the retry action depending on the actuating direction of the actuator.

In accordance with a nineteenth aspect of the present invention, the control device according to any one of the first to eighteenth aspects is configured so that the controller is configured to determine whether the electric power source is in the first power-source state or in the second power-source state based on at least one of a voltage, a current, and a temperature of the electric power source.

With the control device according to the nineteenth aspect, it is possible to reliably determine whether the electric power source is in the first power-source state or in the second power-source state.

In accordance with a twentieth aspect of the present invention, a control device for a human-powered vehicle comprises a controller configured to control an actuator to move an output member based on control information. The controller is configured to control the actuator to move the output member in a first actuating manner in a first device state where the control information indicates a first movement of the actuator and where a movement of the output member does not reach a target movement after the controller controls the actuator based on the control information. The controller is configured to control the actuator to move the output member in a second actuating manner different from the first actuating manner in a second device state where the control information indicates a second movement of the actuator and where the movement of the output member does not reach the target movement after the controller controls the actuator based on the control information. The first movement has first actuating force. The second movement has second actuating force different from the first actuating force.

With the control device according to the twentieth aspect, it is possible to change an actuating manner of the actuator in a retry action depending on a movement caused by the actuator when the movement of the output member does not reach the target movement. Different movements caused by the actuator may cause different power consumption of the actuator. Thus, it is possible to reduce power consumption of the actuator in the retry action depending on the movement of the actuator.

In accordance with a twenty-first aspect of the present invention, a derailleur for a human-powered vehicle comprises a base, a movable member movably coupled to the base, the control device according to any one of the first to twentieth aspects, the actuator, and the detector. The movable member is movably coupled to the base. The actuator includes the output member. The actuator is configured to move the output member using electricity supplied from the electric power source. The detector is configured to detect actuating information relating to the movement of the output member. The actuator is coupled to the movable member to move the movable member relative to the base using the electricity supplied from the electric power source. The detector is configured to detect a movement of the movable member relative to the base as the actuating information.

With the derailleur according to the twenty-first aspect, it is possible to reduce power consumption of the actuator in a retry action depending on the state of the electric power source. Thus, it is possible to reduce power consumption of the derailleur depending on the state of the electric power source.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
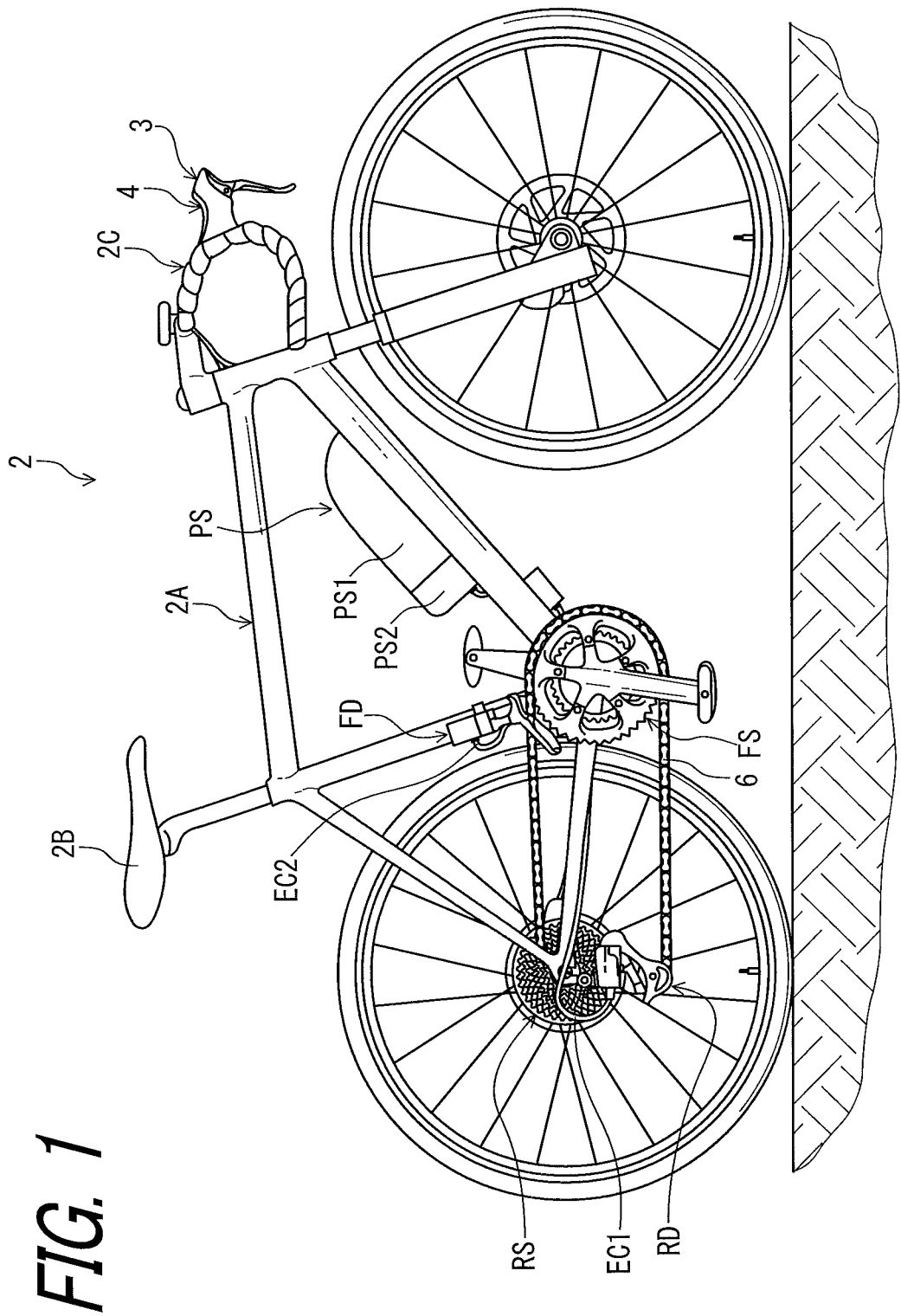
FIG. 1 is a side elevational view of a human-powered vehicle including a derailleur in accordance with a first embodiment.

The embodiment(s) will now be described with reference to the accompanying drawings, wherein like reference numerals designate corresponding or identical elements throughout the various drawings.

First Embodiment

As seen in FIG. 1, a human-powered vehicle 2 includes a vehicle body 2A, a saddle 2B, a handlebar 2C, an operating device 3, an operating device 4, a derailleur FD, a derailleur RD, a chain 6, a sprocket assembly FS, a sprocket assembly RS, and an electric power source PS. The operating device 3 is configured to receive a user input to operate the derailleur FD. The operating device 3 is configured to generate a control signal in response to the user input. The operating device 4 is configured to receive a user input to operate the derailleur RD. The operating device 4 is configured to generate a control signal in response to the user input. The operating devices 3 and 4 are mounted to the handlebar 2C.

The sprocket assembly RS is rotatably coupled to the vehicle body 2A. The sprocket assembly FS is rotatably coupled to the vehicle body 2A. The sprocket assembly FS includes a plurality of sprockets. The sprocket assembly RS includes a plurality of sprockets. The chain 6 is engaged with one of the plurality of sprockets of the sprocket assembly FS and one of the plurality of sprockets of the sprocket assembly RS to transmit rotational force from the sprocket assembly FS to the sprocket assembly RS.

The derailleur FD is configured to be mounted to the vehicle body 2A. The derailleur FD is configured to move the chain 6 relative to the sprocket assembly FS in response to the control signal generated by the operating device 3. The derailleur RD is configured to be mounted to the vehicle body 2A. The derailleur RD is configured to move the chain 6 relative to the sprocket assembly RS in response to the control signal generated by the operating device 4.

The electric power source PS is electrically connected to the derailleur RD to supply electricity to the derailleur RD. The electric power source PS is electrically connected to the derailleur FD to supply electricity to the derailleur FD.

In the first embodiment, the derailleur FD is a front derailleur. The derailleur RD is a rear derailleur. The sprocket assembly FS is a front sprocket assembly. The sprocket assembly RS is a rear sprocket assembly. However, the structure of the derailleur FD can be applied to other devices if needed and/or desired. The structure of the derailleur RD can be applied to other devices if needed and/or desired. The same applies to other embodiments and modifications thereof.

In the present disclosure, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present disclosure, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the human-powered vehicle 2 with facing the handlebar 2C. Accordingly, these terms, as utilized to describe the derailleur RD, the derailleur FD, or other components, should be interpreted relative to the human-powered vehicle 2 equipped with the derailleur RD and the derailleur FD as used in an upright riding position on a horizontal surface.

Figure 2:
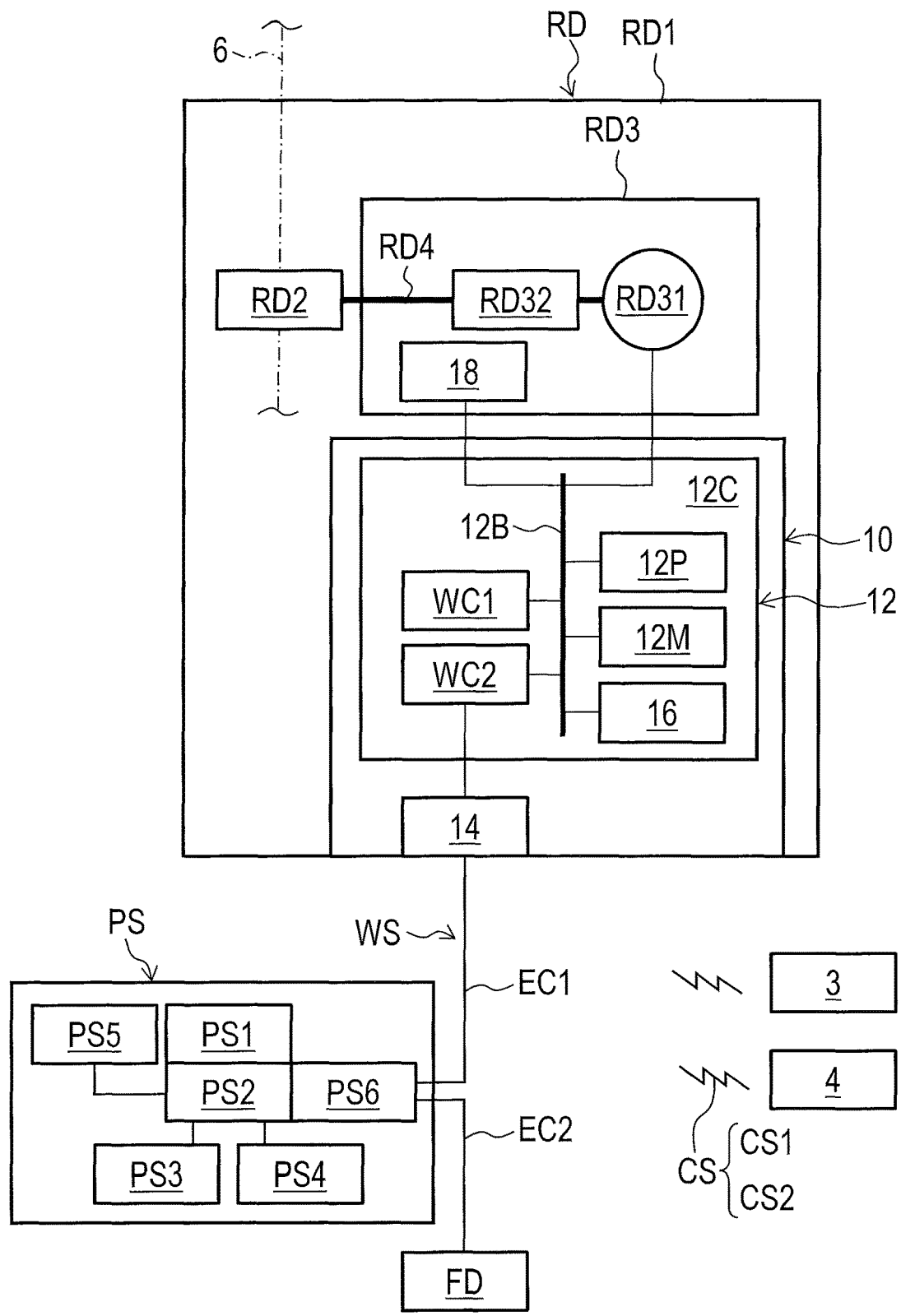
FIG. 2 is a schematic block diagram of the derailleur including a control device in accordance with the first embodiment.

As seen in FIG. 2, the electric power source PS is electrically connected to the derailleur RD and derailleur FD via a wired communication structure WS to supply electricity to the derailleur RD and the derailleur FD via the wired communication structure WS. The wired communication structure WS includes electric cables EC1 and EC2. The derailleur RD is electrically connected to the electric power source PS via the electric cable EC1. The derailleur FD is electrically connected to the electric power source PS via the electric cable EC2.

The electric power source PS includes a battery PS1 and a battery holder PS2. The battery holder PS2 is configured to detachably and reattachably hold the battery PS1. The battery holder PS2 is mounted on the vehicle body 2A (see FIG. 1). The battery holder PS2 is electrically connected to the derailleurs RD and FD via the wired communication structure WS. The battery holder PS2 is electrically connected to the derailleur RD via the electric cable EC1. The battery holder PS2 is electrically connected to the derailleur FD via the electric cable EC2. However, the electric power source PS can be directly mounted to the derailleur RD if needed and/or desired. The electric power source PS can be directly mounted to the derailleur FD if needed and/or desired.

The derailleur FD has substantially the same structure as the structure of the derailleur RD. Thus, the derailleur RD will be described here but the derailleur FD will not be described here for the sake of brevity. The description regarding the derailleur RD can be utilized as the description of the derailleur FD.

As seen in FIG. 2, the derailleur RD for the human-powered vehicle 2 comprises a base RD1, a movable member RD2, and an actuator RD3. The base RD1 member is configured to be coupled to the vehicle body 2A of the human-powered vehicle 2. The movable member RD2 is movably coupled to the base RD1. The movable member RD2 is contactable with the chain 6. The movable member RD2 is configured to move the chain 6 relative to the sprocket assembly RS (see e.g., FIG. 1). For example, the movable member RD2 includes a linkage, a chain guide and a movable body. The chain guide is movable relative to the base RD1. The chain guide is pivotally coupled to the movable body. The movable body is pivotally coupled to the linkage. The movable body is movably coupled to the base member via the linkage. Thus, the linkage movably couples the base and the chain guide. However, the structure of the movable member RD2 is not limited to the above structure.

The actuator RD3 includes an output member RD4. The output member RD4 is operatively coupled to the movable member RD2. The actuator RD3 is configured to move the movable member RD2 using electricity supplied from the electric power source PS. The actuator RD3 is coupled to the movable member RD2 to move the movable member RD2 relative to the base RD1 using the electricity supplied from the electric power source PS.

The actuator RD3 includes a motor RD31 and a gear structure RD32. The motor RD31 is configured to generate rotational force and is coupled to the gear structure RD32. The gear structure RD32 couples the motor RD31 and the movable member RD2 to transmit the rotational force from the motor RD31 to the movable member RD2. The gear structure RD32 includes the output member RD4 coupled to the movable member RD2.

The derailleur RD for the human-powered vehicle 2 comprises a control device 10. The control device 10 is configured to control the actuator RD3 in response to the operation of the operating device 4.

The control device 10 for the human-powered vehicle 2 comprises a controller 12. The controller 12 is configured to control the actuator RD3 to move the output member RD4 based on control information. The controller 12 is electrically connected to the actuator RD3 to control the actuator RD3 based on the control information. For example, the control information includes a control signal CS transmitted from the operating device 4. The controller 12 is configured to control the actuator RD3 to move the output member RD4 based on the control signal CS transmitted from the operating device 4.

The control signal CS includes a first control signal CS1 and a second control signal CS2. For example, the first control signal CS1 indicates one of upshifting and downshifting of the derailleur RD. The second control signal CS2 indicates the other of upshifting and downshifting of the derailleur RD.

As seen in FIG. 2, the controller 12 includes a processor 12P, a memory 12M, a circuit board 12C, and a bus 12B. The processor 12P and the memory 12M are electrically mounted on the circuit board 12C. The processor 12P and the memory 12M are electrically connected to the circuit board 12C via the bus 12B. The processor 12P is electrically connected to the memory 12M via the circuit board 12C and the bus 12B.

For example, the processor 12P includes at least one of a central processing unit (CPU), a micro processing unit (MPU), and a memory controller. The memory 12M is electrically connected to the processor 12P. For example, the memory 12M includes at least one of a volatile memory and a non-volatile memory. Examples of the volatile memory include a random-access memory (RAM) and a dynamic random-access memory (DRAM). Examples of the non-volatile memory include a read only memory (ROM) and an electrically erasable programmable ROM. The memory 12M includes storage areas each having an address in the ROM and the RAM. The processor 12P is configured to control the memory 12M to store data in the storage areas of the memory 12M and reads data from the storage areas of the memory 12M. The processor 12P can also be referred to as a hardware processor 12P. The memory 12M can also be referred to as a hardware memory 12M. The memory 12M can also be referred to as a computer-readable storage medium 12M.

The controller 12 is programmed to execute at least one control algorithm of the control device 10. The memory 12M (e.g., the ROM) stores at least one program including at least one program instructions. The at least one program is read into the processor 12P, and thereby the at least one control algorithm of the control device 10 is executed based on the at least one program. The controller 12 can also be referred to as a control circuit or circuitry 12A. The controller 12 can also be referred to as a hardware controller 12.

The structure of the controller 12 is not limited to the illustrated structure. The structure of the controller 12 is not limited to the processor 12P, the memory 12M, the circuit board 12C, and the bus 12B. The controller 12 can be realized by hardware alone or a combination of hardware and software. The processor 12P and the memory 12M can be integrated as one chip such as an application specific integrated circuit (ASIC) or a field programmable gate array (FPGA).

As seen in FIG. 2, the control device 10 comprises a wireless communicator WC1. The wireless communicator WC1 is configured to wirelessly communicate with an additional wireless communicator of the operating device 4. The wireless communicator WC1 is electrically connected to the controller 12. The wireless communicator WC1 is electrically mounted on the circuit board 12C. The wireless communicator WC1 is electrically connected to the processor 12P and the memory 12M via the circuit board 12C and the bus 12B. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. In the first embodiment, the wireless communicator WC1 is configured to encrypt signals using a cryptographic key to generate encrypted wireless signals. The wireless communicator WC1 is configured to transmit wireless signals via the antenna.

The wireless communicator WC1 is configured to receive wireless signals via the antenna. In the first embodiment, the wireless communicator WC1 is configured to decode the wireless signals to recognize signals transmitted from other wireless communicators such as the additional wireless communicator of the operating device 4. The wireless communicator WC1 is configured to decrypt the wireless signals using the cryptographic key.

As seen in FIG. 2, the control device 10 comprises a connector port 14. The connector port 14 is configured to receive electricity from the electric power source PS. The connector port 14 is electrically connected to the controller 12, the wireless communicator WC1, and the actuator RD3. The controller 12, the wireless communicator WC1, and the actuator RD3 are configured to receive electricity from the electric power source PS via the connector port 14. In the first embodiment, the connector port 14 is configured to be electrically connected to the electric power source PS via the electric cable EC1 detachably and reattachably connected to the connector port 14. However, the electric power source PS can be directly coupled to the connector port 14 if needed and/or desired. In such an embodiment, the connector port 14 includes a lock structure configured to detachably and reattachably hold the electric power source PS.

The control device 10 comprises a wired communicator WC2. The wired communicator WC2 is electrically connected to the controller 12, the wireless communicator WC1, the actuator RD3, and the connector port 14. The wired communicator WC2 is configured to receive electricity from the electric power source PS via the connector port 14.

The wired communicator WC2 is configured to communicate with an additional wired communicator of an additional component (e.g., an additional wired communicator of the electric power source PS, an additional wired communicator of the derailleur FD) via the wired communication structure WS using power line communication technology. Power line communication (PLC) carries data on a conductor that is also used simultaneously for electric power transmission or electric power distribution to components such as the derailleurs RD and FD. The wired communicator WC2 can also be referred to as a wired communicator circuit or circuitry WC2.

For example, the wired communication structure WS includes a ground line and a voltage line that are detachably connected to a serial bus that is formed by communication interfaces. In the first embodiment, the wired communicator WC2 is configured to communicate with additional wired communicators of the electric power source PS and the derailleur FD through the voltage line using the PLC technology. The wired communicator WC2 is configured to superimpose signals on a power source voltage applied from the electric power source PS to the wired communication structure WS. The wired communicator WC2 is configured to receive a signal from the controller 12 and is configured to superimpose the signal on the power source voltage. The wired communicator WC2 is configured to separate, from the power source voltage, signals superimposed on the power source voltage of the wired communication structure WS. The wired communicator WC2 is configured to transmit to the controller 12 signals separated from the power source voltage. The wired communicator WC2 can be omitted from the control device 10 in a case where batteries are directly attached to the derailleur FD and RD and where the derailleurs FD and RD include wired communicators.

The additional wired communicator of the electric power source PS is provided in the battery holder PS2 and is configured to communicate with the wired communicator WC2 via the wired communication structure WS using the PLC. The additional wired communicator of the derailleur FD is configured to communicate with the wired communicator WC2 via the wired communication structure WS using the PLC. Thus, the controller 12 is configured to communicate with the electric power source PS and the derailleur FD via the wired communicator WC2 and the wired communication structure WS using the PLC.

As seen in FIG. 2, the control device 10 includes an informing unit 16. The informing unit 16 is configured to inform the user of status of at least one of the control device 10 and the derailleur RD. For example, the informing unit 16 is electrically mounted on the circuit board 12C of the controller 12. The informing unit 16 is electrically connected to the controller 12. The controller 12 is configured to control the informing unit 16 to inform the user of the status of the derailleur RD. Examples of the status of at least one of the control device 10 and the derailleur RD include a state of the wireless communication, a state of pairing of the wireless communicator WC1, a state of the electric power source PS, and a malfunction of the derailleur RD (e.g., a malfunction of the actuator RD3). Examples of the informing unit 16 include a light emitting diode, a lamp, a speaker, and a vibrator. In the first embodiment, the informing unit 16 includes a light emitting diode (LED) configured to emit light. However, the informing unit 16 can include other components if needed and/or desired.

As seen in FIG. 2, the derailleur RD for the human-powered vehicle 2 comprises a detector 18. The detector 18 is configured to detect actuating information relating to a movement of the output member RD4. The movable member RD2 is coupled to the output member RD4 of the actuator RD3 to move relative to the base RD1 along with the output member RD4. Thus, the detector 18 is configured to detect a movement of the movable member RD2 relative to the base RD1 as the actuating information.

The movement of the output member RD4 includes at least one of a position of the output member RD4 and an amount of movement of the output member RD4. In the first embodiment, the movement of the output member RD4 includes both of the position of the output member RD4 and the amount of movement of the output member RD4. However, the movement of the output member RD4 can include only one of the position of the output member RD4 and the amount of movement of the output member RD4 if needed and/or desired.

The detector 18 is configured to detect the position of the output member RD4 as the actuating information. For example, the detector 18 is configured to detect a rotational position of the output member RD4. Examples of the detector 18 include an encoder and a potentiometer. Examples of the encoder include an optical encoder and a magnetic encoder. The detector 18 is configured to detect a relative position of the output member RD4. However, the detector 18 can be configured to detect an absolute position of the output member RD4 if needed and/or desired.

The controller 12 is electrically connected to the detector 18 to obtain the actuating information detected by the detector 18. The controller 12 is electrically connected to the detector 18 to obtain the movement of the output member RD4 detected by the detector 18. The controller 12 is electrically connected to the detector 18 to obtain the position of the output member RD4 detected by the detector 18. The controller 12 is configured to periodically obtain a current position of the output member RD4 detected by the detector 18. The controller 12 is configured to periodically store the current position of the output member RD4 detected by the detector 18.

Figure 3:
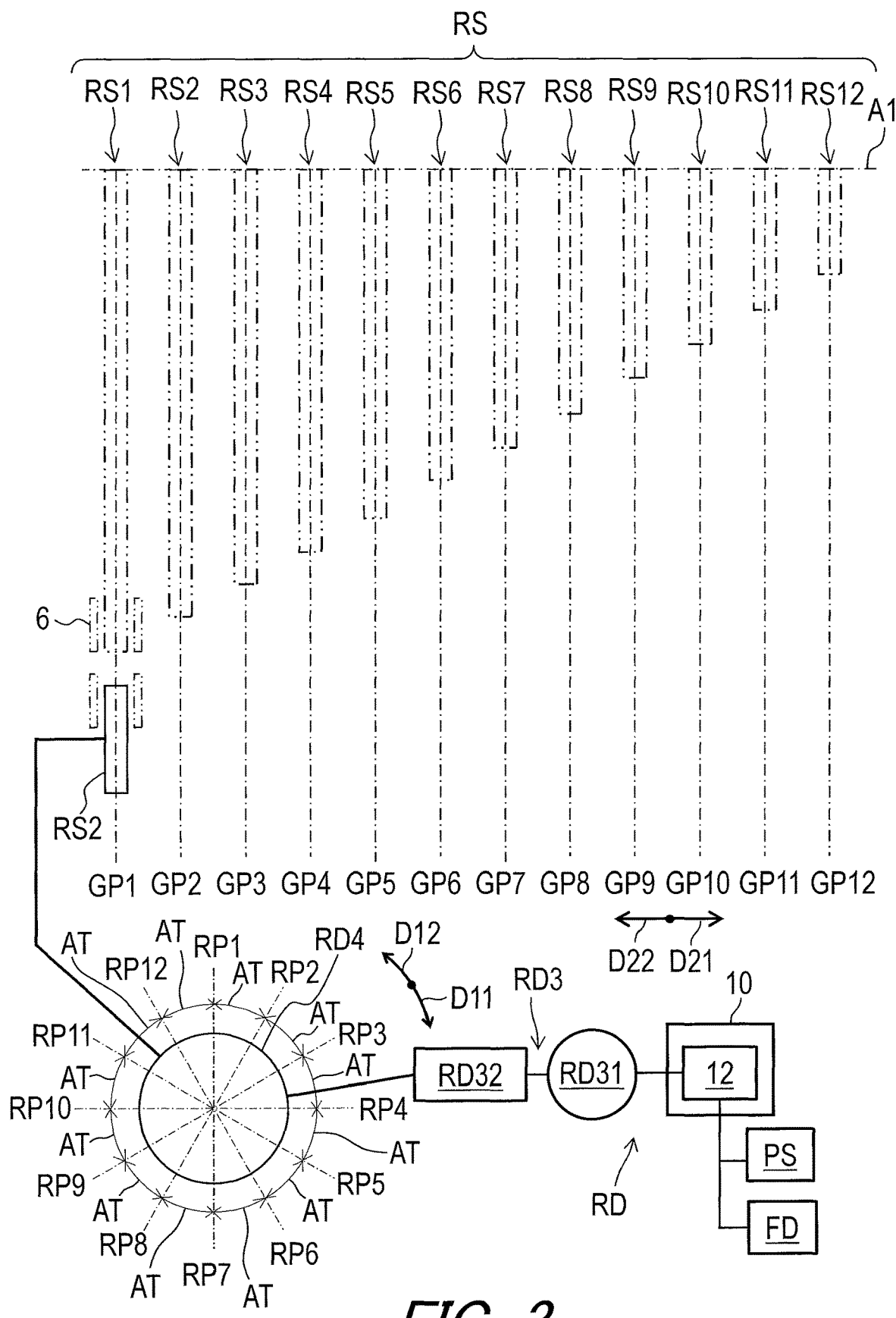
FIG. 3 is a schematic view of a sprocket assembly and the derailleur illustrated in FIG. 1.

As seen in FIG. 3, the derailleur RD has a plurality of gear positions GP1 to GP12. The controller 12 is configured to control the actuator RD3 to selectively stop the movable member RD2 in each of the gear positions GP1 to GP12. The sprocket assembly RS includes a plurality of sprockets RS1 to RS12. The sprocket assembly RS is rotatable about a rotational axis A1. The sprocket RS1 has the largest outer diameter among the plurality of sprockets RS1 to RS12 and corresponds to a low gear of the sprocket assembly RS. The sprocket RS12 has the smallest outer diameter among the plurality of sprockets RS1 to RS12 and corresponds to a top gear of the sprocket assembly RS. The gear positions GP1 to GP12 of the movable member RD2 respectively correspond to the sprockets RS1 to RS12 of the sprocket assembly RS.

The output member RD4 has a plurality of positions RP1 to RP12. The positions RP1 to RP12 can also be referred to as rotational positions RP1 to RP12 in a case where the actuator RD3 rotates the output member RD4. For example, a position of a gear included in the gear structure RD32 is sensed as the position of the output member RD4. The positions RP1 to RP12 of the output member RD4 respectively corresponds to the gear positions GP1 to GP12 of the movable member RD2. For example, the movable member RD2 is moved from the gear position GP1 to GP2 when the actuator RD3 moves the output member RD4 from the position RP1 to the position RP2.

The controller 12 is configured to control the actuator RD3 to move the output member RD4 in a first actuating direction D11 by one gear stage in response to the first control signal CS1. The controller 12 is configured to control the actuator RD3 to move the output member RD4 in a second actuating direction D12 by one gear stage in response to the second control signal CS2. For example, the controller 12 is configured to control the actuator RD3 to move the output member RD4 from the position RP1 to the position RP2 in response to the first control signal CS1 when the output member RD4 is in the position RP1. The controller 12 is configured to control the actuator RD3 to move the output member RD4 from the position RP2 to the position RP1 in response to the second control signal CS2 when the output member RD4 is in the position RP2.

The actuator RD3 is configured to move the movable member RD2 via the output member RD4. Thus, the controller 12 is configured to control the actuator RD3 to move the movable member RD2 in a first actuating direction D21 by one gear stage in response to the first control signal CS1. The controller 12 is configured to control the actuator RD3 to move the movable member RD2 in a second actuating direction D22 by one gear stage in response to the second control signal CS2. For example, the controller 12 is configured to control the actuator RD3 to move the movable member RD2 from the gear position GP1 to the gear position GP2 in response to the first control signal CS1 when the movable member RD2 is in the gear position GP1. The controller 12 is configured to control the actuator RD3 to move the movable member RD2 from the gear position GP2 to the gear position GP1 in response to the second control signal CS2 when the movable member RD2 is in the gear position GP2.

Figure 4:
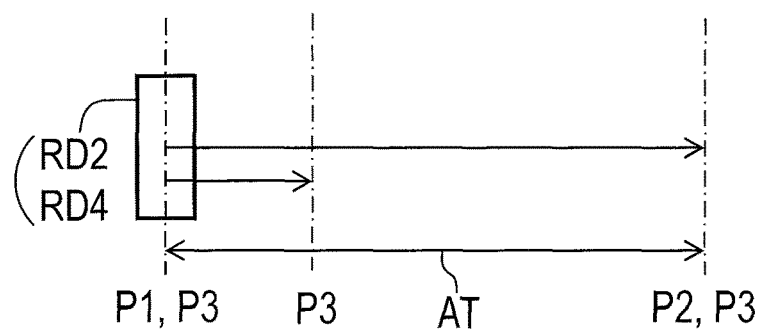
FIG. 4 is a schematic view showing a start position and a target position of an output member of an actuator of the derailleur when a movement of the output member reaches a target movement.

As seen in FIG. 4, the controller 12 is configured to control the output member RD4 from a start position P1 to a target position P2 in response to the control information. The start position P1 can be one of the positions RP1 to RP12 (see e.g., FIG. 3). The target position P2 can be another of the positions RP1 to RP12 (see e.g., FIG. 3) which is adjacent to the start position P1 without another position therebetween. A difference between the start position P1 and the target position P2 corresponds to the one gear stage of the derailleur RD. The difference between the start position P1 and the target position P2 corresponds to a target amount of movement AT.

The controller 12 is configured to periodically obtain a current position P3 of the output member RD4 detected by the detector 18. The controller 12 is configured to control the actuator RD3 to start to move the output member RD4 in response to the control information (e.g., the first control signal CS1, the second control signal CS2). The controller 12 is configured to periodically compare the current position P3 with the target position P2 after the actuator RD3 moves the output member RD4 from the start position P1 toward the target position P2. The controller 12 is configured to control the actuator RD3 to stop the output member RD4 when the current position P3 reaches the target position P2.

The controller 12 is configured to store the target position P2 as the start position P1 after the actuator RD3 moves the output member RD4 from the start position P1 to the target position P2. The controller 12 can be configured to obtain the start position P1 of the output member RD4 detected by the detector 18 before the controller 12 controls the actuator RD3 to move the output member RD4 in response to the control information.

As seen in FIG. 3, the controller 12 is configured to store, in the memory 12M, the target amount of movement AT defined between adjacent two positions of the plurality of positions RP1 to RP12. The controller 12 is configured to select the target amount of movement AT based on the start position P1 and the target position P2 when the controller 12 selects the target position P2.

Figure 5:
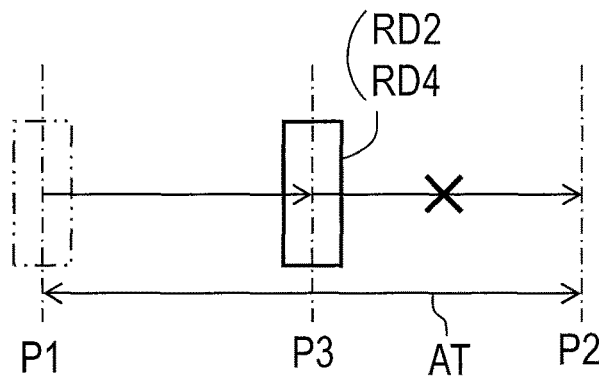
FIG. 5 is a schematic view showing the start position and the target position of the output member of the actuator when the movement of the output member does not reach the target movement.

As seen in FIG. 5, the movement of the output member RD4 does not reach a target movement if the movement of at least one of the output member RD4 and the movable member RD2 is restricted by foreign substances, if the actuator RD3 (e.g., the motor RD31, the gear structure RD32) is damaged, or if force necessary to move the chain 6 exceeds the force generated by the actuator RD3 due to foreign substances attached to the sprocket assembly RS.

The target movement includes at least one of the target position P2 of the output member RD4 and the target amount of movement AT of the output member RD4. In the first embodiment, the target movement includes both of the target position P2 of the output member RD4 and the target amount of movement AT of the output member RD4. However, the target movement includes only one of the target position P2 of the output member RD4 and the target amount of movement AT of the output member RD4.

Thus, the controller 12 is configured to determine whether the movement of the output member RD4 reaches the target movement after the controller 12 controls the actuator RD3 based on the control information. The controller 12 is configured to determine whether the current position P3 of the output member RD4 reaches the target position P2 after the controller 12 controls the actuator RD3 based on the control information. The controller 12 is configured to determine whether the amount of movement of the output member RD4 reaches the target amount of movement AT after the controller 12 controls the actuator RD3 based on the control information.

For example, the controller 12 is configured to store a current stop position of the output member RD4 as the start position P1 when or before the controller 12 receive the control information. The controller 12 is configured to select the target position P2 from among the positions RP1 to RP12 based on the start position P1 and the control information.

The controller 12 is configured to select, as the target position P2, one of the positions RP1 to RP12 which is adjacent to the start position P1 in the first actuating direction D11 if the controller 12 receives the first control signal CS1. The controller 12 is configured to select, as the target position P2, one of the positions RP1 to RP12 which is adjacent to the start position P1 in the second actuating direction D12 if the controller 12 receives the second control signal CS2. The controller 12 is configured to temporarily store the start position P1 and the target position P2 in the memory 12M.

As seen in FIG. 2, the controller 12 is configured to determine whether the electric power source PS is in a first power-source state or a second power-source state different from the first power-source state. In the first embodiment, the electric power source PS has a first remaining level if the electric power source PS is in the first power-source state. The electric power source PS has a second remaining level if the electric power source PS is in the second power-source state. The second remaining level is different from the first remaining level. In the first embodiment, the second remaining level is lower than the first remaining level. However, the second remaining level can be higher than or equal to the first remaining level if needed and/or desired.

The controller 12 is configured to obtain remaining level information relating to a remaining level of the electric power source PS. The remaining level of the electric power source PS includes at least one of a state of charge (SOC) of the electric power source PS and a depth of discharge (DOD) of the electric power source PS. The SOC of the electric power source PS is a ratio of a level of charge of the electric power source PS to a capacity of the electric power source PS. The DOD of the electric power source PS is an inverse number of the SOC of the electric power source PS. In the first embodiment, the remaining level of the electric power source PS includes the SOC of the electric power source PS. However, the remaining level of the electric power source PS can include the DOD of the electric power source PS if needed and/or desired.

Furthermore, the electric power source PS has a first capacity if the electric power source PS is in the first power-source state. The electric power source PS has a second capacity if the electric power source PS is in the second power-source state. The second capacity is different from the first capacity. In the first embodiment, the second capacity is smaller than the first capacity. However, the second capacity can be larger than or equal to the first capacity if needed and/or desired.

The controller 12 is configured to obtain capacity information relating to a capacity of the electric power source PS. The capacity of the electric power source PS includes at least one of a rated discharged capacity of the electric power source PS and a state of health (SOH) of the electric power source PS. In the first embodiment, the capacity of the electric power source PS includes the SOH of the electric power source PS. The SOH of the electric power source PS is a ratio of a current full charge capacity of the electric power source PS to an original full charge capacity (e.g., a rated discharged capacity) of the electric power source PS. The SOH indicates a degree of deterioration of the electric power source PS. The capacity of the electric power source PS can include a rated discharged capacity if needed and/or desired.

As seen in FIG. 2, the controller 12 is configured to determine whether the electric power source PS is in the first power-source state or in the second power-source state based on at least one of a voltage, a current, and a temperature of the electric power source PS. In the first embodiment, the electric power source PS includes a voltage sensor PS3, a current sensor PS4, a temperature sensor PS5, and an additional wired communicator PS6. The voltage sensor PS3 is configured to sense the voltage of the electric power source PS. The current sensor PS4 is configured to sense the current of the electric power source PS. The temperature sensor PS5 is configured to sense the temperature of the electric power source PS.

The additional wired communicator PS6 is configured to communicate with the wired communicator WC2 of the control device 10 via the wired communication structure WS using the PLC. The additional wired communicator PS6 is configured to transmit to the control device 10 the voltage sensed by the voltage sensor PS3, the current sensed by the current sensor PS4, and the temperature sensed by the temperature sensor PS5. The controller 12 is configured to obtain from the electric power source PS the voltage sensed by the voltage sensor PS3, the current sensed by the current sensor PS4, and the temperature sensed by the temperature sensor PS5 via the additional wired communicator PS6, the wired communication structure WS, and the wired communicator WC2 using the PLC.

The controller 12 is configured to calculate an estimated remaining level of the electric power source PS based on at least one of the voltage, the current, and the temperature of the electric power source PS. In the first embodiment, the controller 12 is configured to calculate the estimated remaining level (e.g., the SOC) of the electric power source PS based on the voltage, the current, and the temperature. For example, the controller 12 is configured to calculate the estimated remaining level (e.g., the estimated SOC) based on an open circuit voltage (OCV) method or an integrated current value method. The controller 12 is configured to periodically calculated the estimated remaining level of the electric power source PS. The controller 12 is configured to store the estimated remaining level of the electric power source PS.

The controller 12 is configured to periodically compare the estimated remaining level with a remaining level threshold. The controller 12 is configured to store the remaining level threshold in the memory 12M. The controller 12 is configured to determine that the electric power source PS is in the first power-source state if the estimated remaining level is higher than the remaining level threshold. The controller 12 is configured to determine that the electric power source PS is in the second power-source state if the estimated remaining level is lower than the remaining level threshold.

In the first embodiment, the controller 12 is configured to determine that the electric power source PS is in the first power-source state if the estimated remaining level is equal to the remaining level threshold. However, the controller 12 can be configured to determine that the electric power source PS is in the second power-source state if the estimated remaining level is equal to the remaining level threshold. The controller 12 can be configured to calculate the estimated remaining level of the electric power source PS based on at least one of the voltage, the current, and the temperature of the electric power source PS if needed and/or desired.

The controller 12 is configured to calculate the capacity of the electric power source PS based on at least one of the voltage, the current, and the temperature of the electric power source PS. The controller 12 is configured to calculate internal resistance of the electric power source PS based on the voltage and the current. The controller 12 is configured to calculate a ratio of current internal resistance to initial internal resistance of the electric power source PS to obtain the capacity (e.g., a SOH). The controller 12 is configured to periodically calculated the capacity of the electric power source PS. The controller 12 is configured to store the capacity of the electric power source PS.

The controller 12 is configured to periodically compare the capacity with a reference capacity. The controller 12 is configured to store the reference capacity in the memory 12M. The controller 12 is configured to determine that the electric power source PS is in the first power-source state if the capacity is higher than the reference capacity. The controller 12 is configured to determine that the electric power source PS is in the second power-source state if the capacity is lower than the reference capacity. In the first embodiment, the controller 12 is configured to determine that the electric power source PS is in the first power-source state if the capacity is equal to the reference capacity. However, the controller 12 can be configured to determine that the electric power source PS is in the second power-source state if the capacity is equal to the reference capacity.

Figure 6:
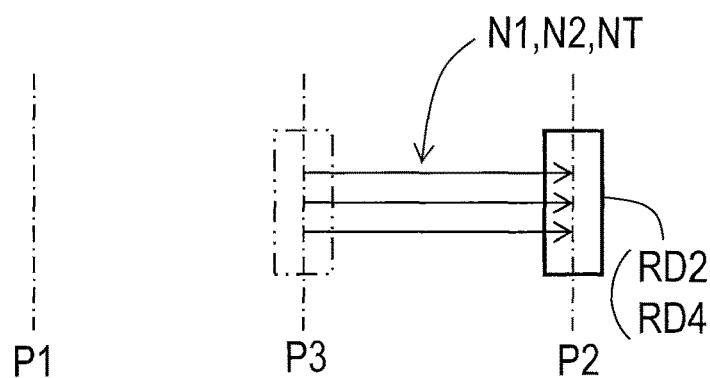
FIG. 6 is a schematic view showing a retry action in which the actuator moves the output member after the movement of the output member does not reach the target movement (the retry action is successfully executed).
Figure 7:
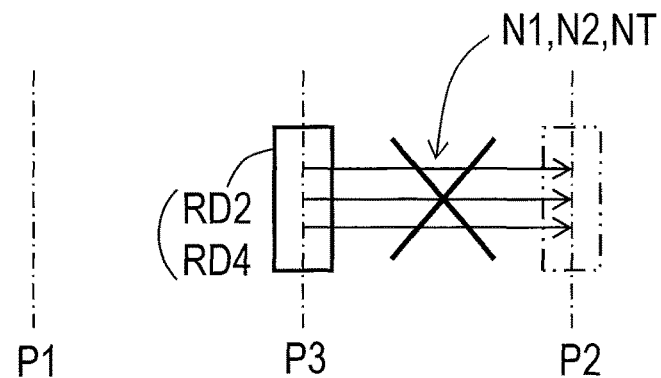
FIG. 7 is a schematic view showing the retry action (the retry action is not successfully executed).

As seen in FIGS. 6 and 7, if the movement of the output member RD4 does not reach the target movement after the controller 12 controls the actuator RD3 based on the control information, the controller 12 is configured to control the actuator RD3 to move the output member RD4 at least once in one of the first actuating manner and the second actuating manner. The above action can also be referred to as a retry action.

However, the retry action affects power consumption in the derailleur RD. Thus, the controller 12 is configured to change an actuating manner of the actuator RD3 in the retry action depending on a state of the electric power source PS.

The retry action does not include an inching action. In the inching action, a movement of an output member of an actuator from a start position to a target position is divided into a plurality of separate movements. At least one temporary target position is set between the start position and the target position. The actuator temporarily stops the output member in each temporary target position in the inching action. In the retry action, such temporary target position is not set between the start position P1 and the target position P2. In the retry action, the actuator RD3 tries to continuously move the output member RD4 from the start position P1 to the target position P2 without temporarily stopping the output member RD4.

Figure 8:
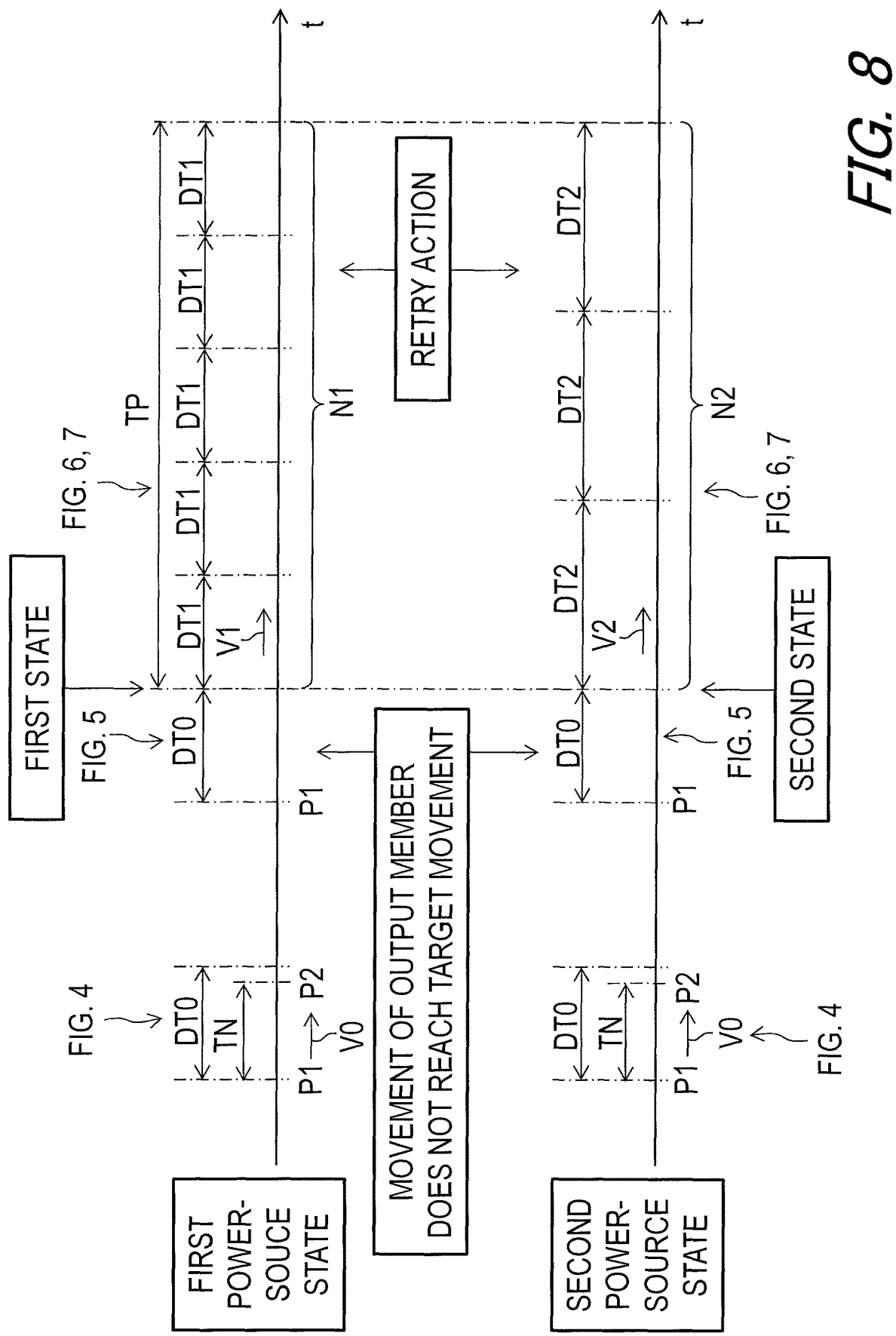
FIG. 8 is a schematic view showing an actuating manner of the actuator in each of a first state and a second state.

As seen in FIG. 8, the controller 12 is configured to control the actuator RD3 to move the output member RD4 in a first actuating manner in a first state where the electric power source PS configured to supply electricity to the actuator RD3 is in the first power-source state and where the movement of the output member RD4 does not reach the target movement after the controller 12 controls the actuator RD3 based on the control information. The controller 12 is configured to control the actuator RD3 to move the output member RD4 in a second actuating manner different from the first actuating manner in the second state where the electric power source PS is in a second power-source state different from the first power-source state and where the movement of the output member RD4 does not reach the target movement after the controller 12 controls the actuator RD3 based on the control information.

A state where the movement of the output member RD4 does not reach the target movement includes at least one of a state where the current position P3 of the output member RD4 does not reach the target position P2 and a state where the amount of movement of the output member RD4 is less than the target amount of movement AT. In the first embodiment, the state where the movement of the output member RD4 does not reach the target movement includes both of the state where the current position P3 of the output member RD4 does not reach the target position P2 and the state where the amount of movement of the output member RD4 is less than the target amount of movement AT. However, the state where the movement of the output member RD4 does not reach the target movement can include only one of the state where the current position P3 of the output member RD4 does not reach the target position P2 and the state where the amount of movement of the output member RD4 is less than the target amount of movement AT.

The controller 12 is configured to control the actuator RD3 to move the output member RD4 at first number of times N1 during an actuating time period TP in the first state. The controller 12 is configured to control the actuator RD3 to move the output member RD4 at second number of times N2 different from the first number of times N1 during the actuating time period TP in the second state. The actuating time period TP in the first state is equal to the actuating time period TP in the second state.

Power consumption of the derailleur RD is first power consumption when the actuator RD3 moves the output member RD4 at the first number of times N1 during the actuating time period TP. Power consumption of the derailleur RD is second power consumption when the actuator RD3 moves the output member RD4 at the second number of times N2 during the actuating time period TP. The second number of times N2 is smaller than the first number of times N1. Thus, the second power consumption of the derailleur RD is lower than the first power consumption of the derailleur RD.

As seen in FIG. 8, the controller 12 is configured to store, in the memory 12M, a normal time period TN which is necessary to move the output member RD4 from the start position P1 to the target position P2. The controller 12 is configured to store an initial determination time period DT0 which is longer than or equal to the normal time period TN. The controller 12 is configured to control the actuator RD3 to move the output member RD4 at an initial speed V0.

The controller 12 is configured to periodically obtain the current position P3 (see e.g., FIG. 4) of the output member RD4 after the controller 12 controls the actuator RD3 to move the output member RD4 based on the control information. The controller 12 is configured to compare the current position P3 with the target position P2 (see e.g., FIG. 4) during the initial determination time period DT0. If the current position of the output member RD4 has reached the target position P2 (see e.g., FIG. 4) when the initial determination time period DT0 elapses, the controller 12 determines that the movement of the output member RD4 reaches the target movement. If the current position P3 of the output member RD4 does not reach the target position P2 (see e.g., FIG. 4) until the initial determination time period DT0 elapses, the controller 12 determines that the movement of the output member RD4 does not reach the target movement.

As seen in FIG. 8, in the first state, the controller 12 is configured to determine whether the movement of the output member RD4 reaches the target movement based on a first determination time period DT1 instead of the initial determination time period DT0. In the second state, the controller 12 is configured to determine whether the movement of the output member RD4 reaches the target movement based on a second determination time period DT2 instead of the initial determination time period DT0. The second determination time period DT2 is different from the first determination time period DT1. The second determination time period DT2 is longer than the first determination time period DT1 since the second number of times N2 is smaller than the first number of times N1. The second determination time period DT2 can be shorter than or equal to the first determination time period DT1 if needed and/or desired.

The controller 12 is configured to control the actuator RD3 to move the output member RD4 at a first speed V1 in the first state. The controller 12 is configured to control the actuator RD3 to move the output member RD4 at a second speed V2 in the first state. The second speed V2 is different from the first speed V1. The second speed V2 is lower than the first speed V1 since the second determination time period DT2 is longer than the first determination time period DT1 while the target amount of movement AT is applied in each of the first state and the second state. The second speed V2 can be higher than or equal to the first speed V1 if needed and/or desired.

As seen in FIG. 6, the controller 12 is configured to control the actuator RD3 to stop the output member RD4 if the movement of the output member RD4 reaches the target movement before the total number of times N at which actuator RD3 moves the output member RD4 reaches the first number of times N1. The controller 12 is configured to control the actuator RD3 to stop the output member RD4 if the movement of the output member RD4 reaches the target movement before the total number of times N at which actuator RD3 moves the output member RD4 reaches the second number of times N2.

As seen in FIG. 7, the controller 12 is configured to control the actuator RD3 to stop the output member RD4 if the movement of the output member RD4 does not reach the target movement after the total number of times at which actuator RD3 moves the output member RD4 reaches the first number of times N1. The controller 12 is configured to control the actuator RD3 to stop the output member RD4 if the movement of the output member RD4 does not reach the target movement before the total number of times at which actuator RD3 moves the output member RD4 reaches the second number of times N2.

The controller 12 is configured to control the informing unit 16 to inform the user of a malfunction of the derailleur RD if the movement of the output member RD4 does not reach the target movement while the actuator RD3 moves the output member RD4 at the first number of times N1 or the second number of times N2. The controller 12 is configured to generate an alert signal if the movement of the output member RD4 does not reach the target movement while the actuator RD3 moves the output member RD4 at the first number of times N1. The controller 12 is configured to transmit the alert signal to another component such as a cyclocomputer via the wireless communicator WC1.

The control of the derailleur RD will be described below referring to FIGS. 9 and 10.

Figure 9:
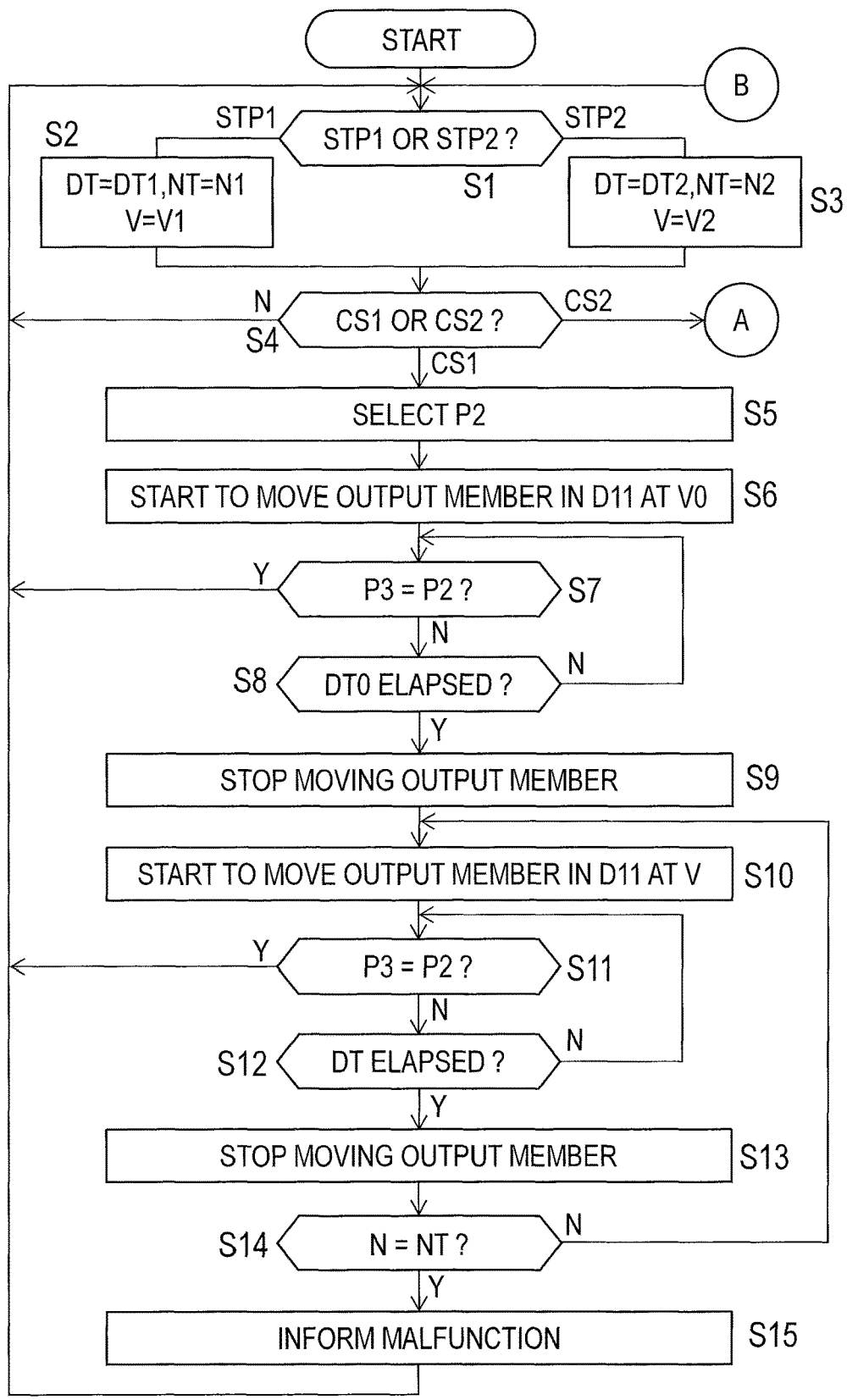
FIGS. 9 and 10 are flowcharts of control executed by the control device of the derailleur illustrated in FIG. 1.

As seen in FIG. 9, it is determined by the controller 12 whether the electric power source PS is in the first power-supply state or the second power-supply state (step S1). In the step S1, for example, it is determined by the controller 12 whether the remaining level of the electric power source PS is higher than or equal to the remaining level threshold and/or whether the capacity of the electric power source PS is higher than or equal to the reference capacity.

The first determination time period DT1 is stored in the memory 12M as a determination time period DT if the electric power source PS is in the first power-source state (steps S1 and S2). The first number of times N1 is stored in the memory 12M as a determination number of times NT if the electric power source PS is in the first power-source state (steps S1 and S2). The first speed V1 is stored in the memory 12M as an applied speed V if the electric power source PS is in the first power-source state (steps S1 and S2).

The second determination time period DT2 is stored in the memory 12M as the determination time period DT (steps S1 and S3). The second number of times N2 is stored in the memory 12M as the determination number of times NT if the electric power source PS is in the second power-source state (steps S1 and S3). The second speed V2 is stored in the memory 12M as the applied speed V if the electric power source PS is in the second power-source state (steps S1 and S3).

It is determined by the controller 12 whether the controller 12 receives the control information (step S4). Specifically, it is determined by the controller 12 whether the controller 12 receives the first control signal CS1 or the second control signal CS2 via the wireless communicator WC1. Steps S5 to S15 are executed by the controller 12 if the controller 12 receives the first control signal CS1. Steps S25 to S35 shown in FIG. 10 are executed by the controller 12 if the controller 12 receives the second control signal CS2. The process returns to the step S1 if the controller 12 does not receive the control information. The step S1 to S3 are repeatedly executed by the controller 12 until the controller 12 receives the control information.

The target position P2 which is adjacent to the start position P1 in the first actuating direction D11 is selected from among the positions RP1 to RP12 based on the start position P1 and the first control signal CS1 (step S5).

The controller 12 controls the actuator RD3 to start to move the output member RD4 in the first actuating direction D11 at the initial speed V0 (step S6). It is determined by the controller 12 whether the current position P3 reaches the target position P2 (step S7). The process returns to the step S1 if the current position P3 reaches the target position P2.

It is determined by the controller 12 whether the initial determination time period DT0 has elapsed after the actuator RD3 starts to move the output member RD4 (step S8). The steps S7 and S8 are repeatedly executed by the controller 12 if the initial determination time period DT0 has not elapsed. The controller 12 controls the actuator RD3 to stop moving the output member RD4 if the initial determination time period DT0 has elapsed before the current position P3 reaches the target position P2 (steps S8 and S9). The process enters the retry action (steps S10 to S14).

In the retry action, the output member RD4 is repeatedly moved by the actuator RD3 at the determination number of times NT. The determination number of times NT is the first number of times N1 if the electric power source PS is in the first power-source state (see steps S1 and S2). The determination number of times NT is the second number of times N2 if the electric power source PS is in the second power-source state (see steps S1 and S3).

The controller 12 controls the actuator RD3 to start to move the output member RD4 in the first actuating direction D11 at the applied speed V (step S10). It is determined by the controller 12 whether the current position P3 reaches the target position P2 (step S11). The process returns to the step S1 if the current position P3 reaches the target position P2. As seen in FIG. 8, the first speed V1 is used as the applied speed V in the first state. The second speed V2 is used as the applied speed V in the second state.

As seen in FIG. 9, it is determined by the controller 12 whether the determination time period DT has elapsed after the actuator RD3 starts to move the output member RD4 (step S12). The steps S11 and S12 are repeatedly executed by the controller 312 if the determination time period DT has not elapsed. The controller 12 controls the actuator RD3 to stop moving the output member RD4 if the determination time period DT has elapsed before the current position P3 reaches the target position P2 (steps S12 and S13).

As seen in FIG. 8, the first determination time period DT1 is used as the determination time period DT in the first state. The second determination time period DT2 is used as the determination time period DT in the second state.

As seen in FIG. 9, it is determined by the controller 12 whether a current number of times N at which the steps S10 to S13 are executed reaches the determination number of times NT. The process returns to the step S10 if the current number of times N does not reach the determination number of times NT (step S14). The malfunction is informed by the informing unit 16 to the user if the current number of times reaches the determination number of times NT before the current position P3 of the output member R4 has not reached the target position P2 (steps S14 and S15).

As seen in FIG. 8, the first number of times N1 is used as the determination number of times NT in the first state. The second number of times N1 is used as the determination number of times NT in the second state.

Figure 10:
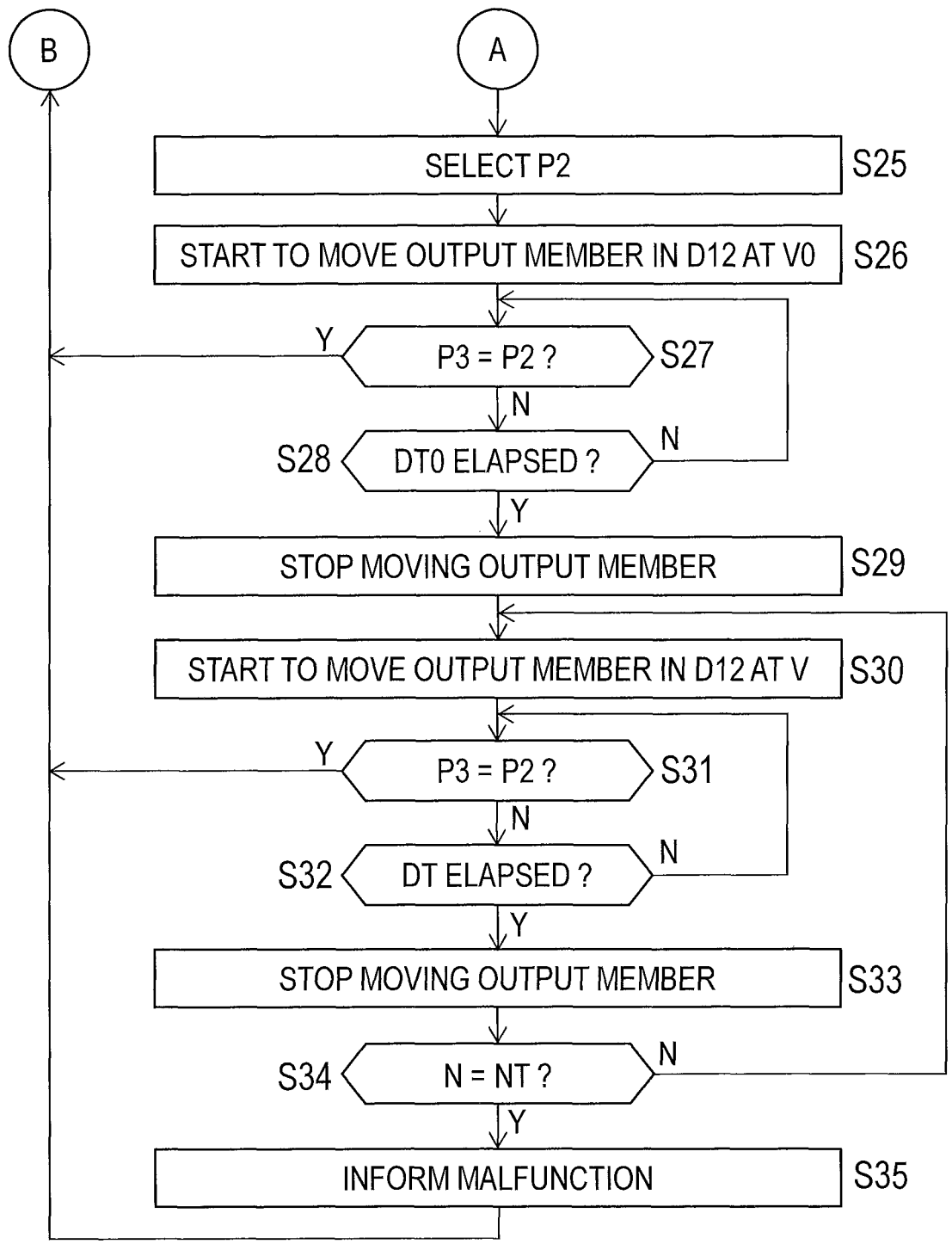

As seen in FIGS. 9 and 10, as with the steps S5 to S15 of FIG. 9, the steps S25 to S35 shown in FIG. 10 are executed by the controller 12 if the controller 12 receives the second control signal CS2 in the step S4 of FIG. 9. The steps S25 to S35 of FIG. 10 are substantially the same as the steps S5 to S15 of FIG. 9 except that the first actuating direction D11 is replaced with the second actuating direction D12. Thus, the description regarding the steps S5 to S15 can be utilized as the description regarding the steps S25 to S35 by replacing "first actuating direction D11" with "second actuating direction D12." The steps S25 to S35 will not be described in detail here for the sake of brevity.

Second Embodiment

A control device 210 in accordance with a second embodiment will be described below referring to FIGS. 11 to 14. The control device 210 has the same structure and/or configuration as those of the control device 10 except for the controller 12. Thus, elements having substantially the same function as those in the first embodiment will be numbered the same here and will not be described and/or illustrated again in detail here for the sake of brevity.

Figure 11:
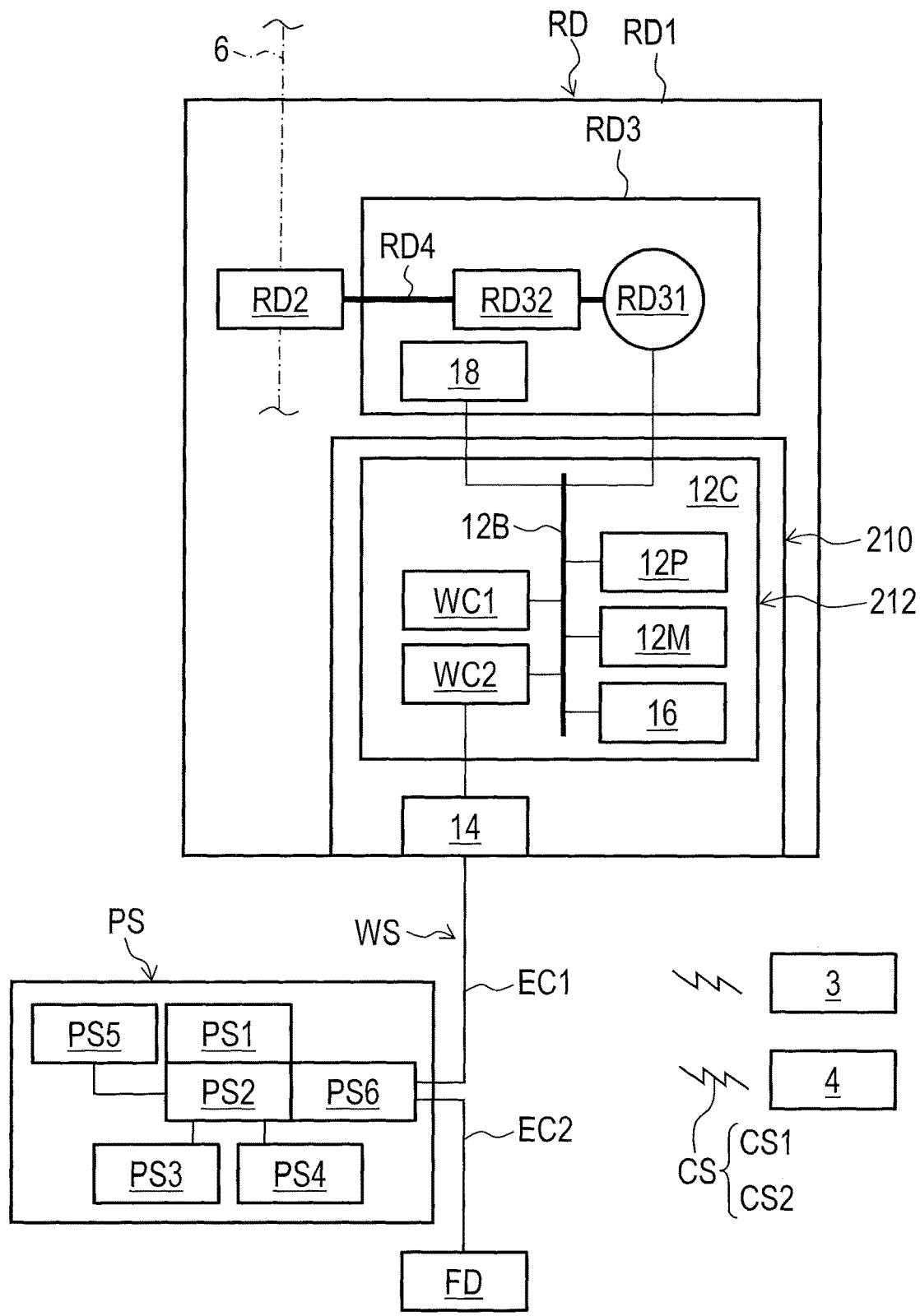
FIG. 11 is a schematic block diagram of a derailleur including a control device in accordance with a second embodiment.

As seen in FIG. 11, the control device 210 for the human-powered vehicle 2 comprises a controller 212. The controller 212 is configured to control the actuator RD3 to move the output member RD4 based on the control information. The controller 212 has substantially the same structure as the structure of the controller 12 described in the first embodiment.

Figure 12:
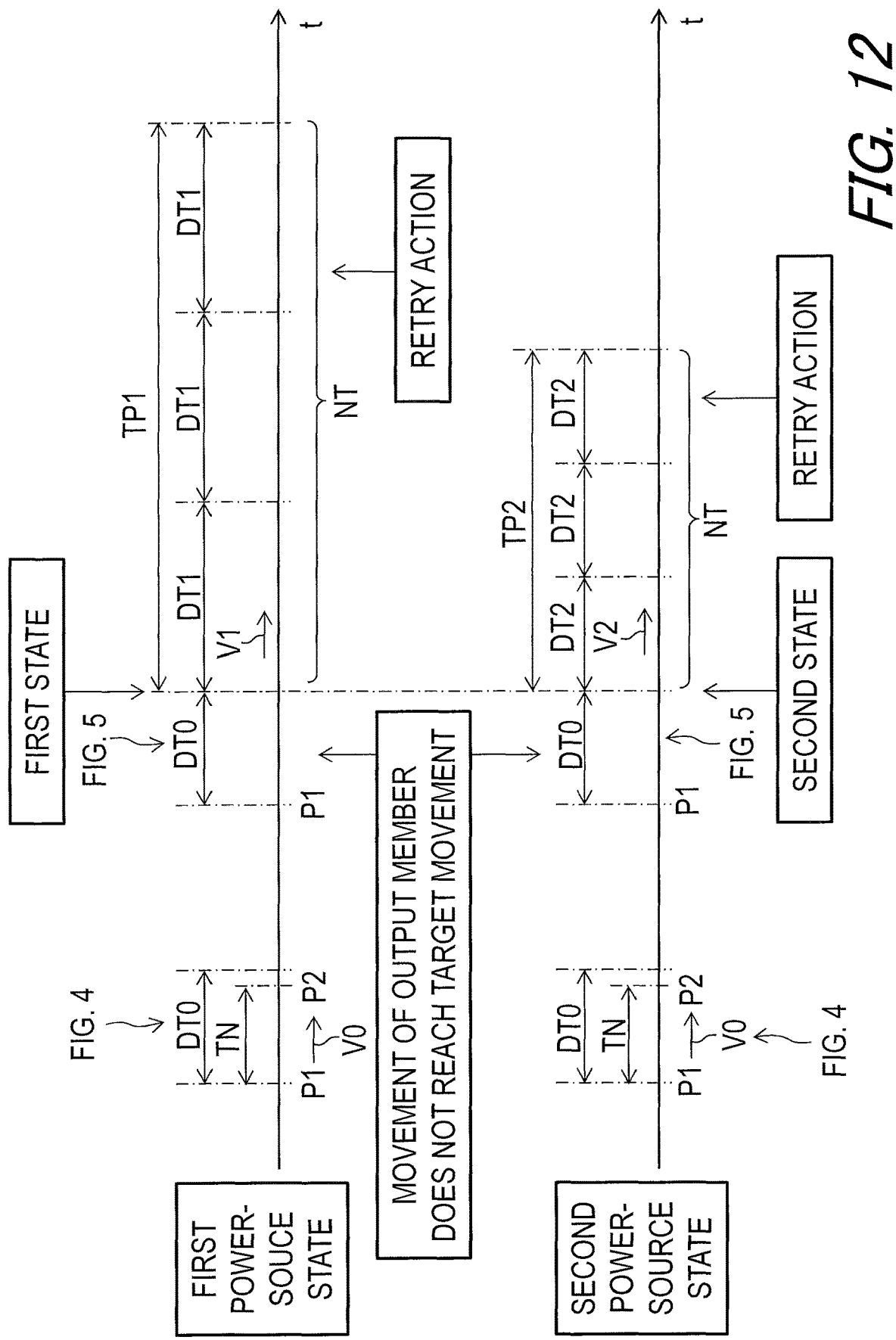
FIG. 12 is a schematic view showing an actuating manner of an actuator of the derailleur illustrated in FIG. 11 in each of a first state and a second state.

As seen in FIG. 12, the controller 212 is configured to control the actuator RD3 to move the output member RD4 in a first actuating manner in a first state where the electric power source PS configured to supply electricity to the actuator RD3 is in the first power-source state and where the movement of the output member RD4 does not reach the target movement after the controller 212 controls the actuator RD3 based on the control information. The controller 212 is configured to control the actuator RD3 to move the output member RD4 in a second actuating manner different from the first actuating manner in a second state where the electric power source PS is in a second power-source state different from the first power-source state and where the movement of the output member RD4 does not reach the target movement after the controller 212 controls the actuator RD3 based on the control information.

In the second embodiment, the controller 212 is configured to control the actuator RD3 to move the output member RD4 during a first actuating time period TP1 in the first state. The controller 212 is configured to control the actuator RD3 to move the output member RD4 during a second actuating time period TP2 different from the first actuating time period TP1 in the second state. In the second embodiment, the second actuating time period TP2 is shorter than the first actuating time period TP1. However, the second actuating time period TP2 can be longer than the first actuating time period TP1 if needed and/or desired.

The controller 212 is configured to control the actuator RD3 to move the output member RD4 at the determination number of times NT during the first actuating time period TP1 in the first state. The controller 212 is configured to control the actuator RD3 to move the output member RD4 at the determination number of times NT during a second actuating time period TP2 different from the first actuating time period TP1 in the second state. The determination number of times NT in the first state is equal to the total number of times in the second state. However, the determination number of times NT in the first state can be different from the determination number of times NT in the second state if needed and/or desired. The first number of times N1, the second number of times N2, or another default number of times is stored in the memory 12M as the determination number of times NT.

In the second embodiment, the second determination time period DT2 is shorter than the first determination time period DT1. The second speed V2 is higher than the first speed V1. However, the second determination time period DT2 can be longer than or equal to the first determination time period DT1 if needed and/or desired. The second speed V2 can be lower than or equal to the first speed V1 if needed and/or desired.

Figure 13:
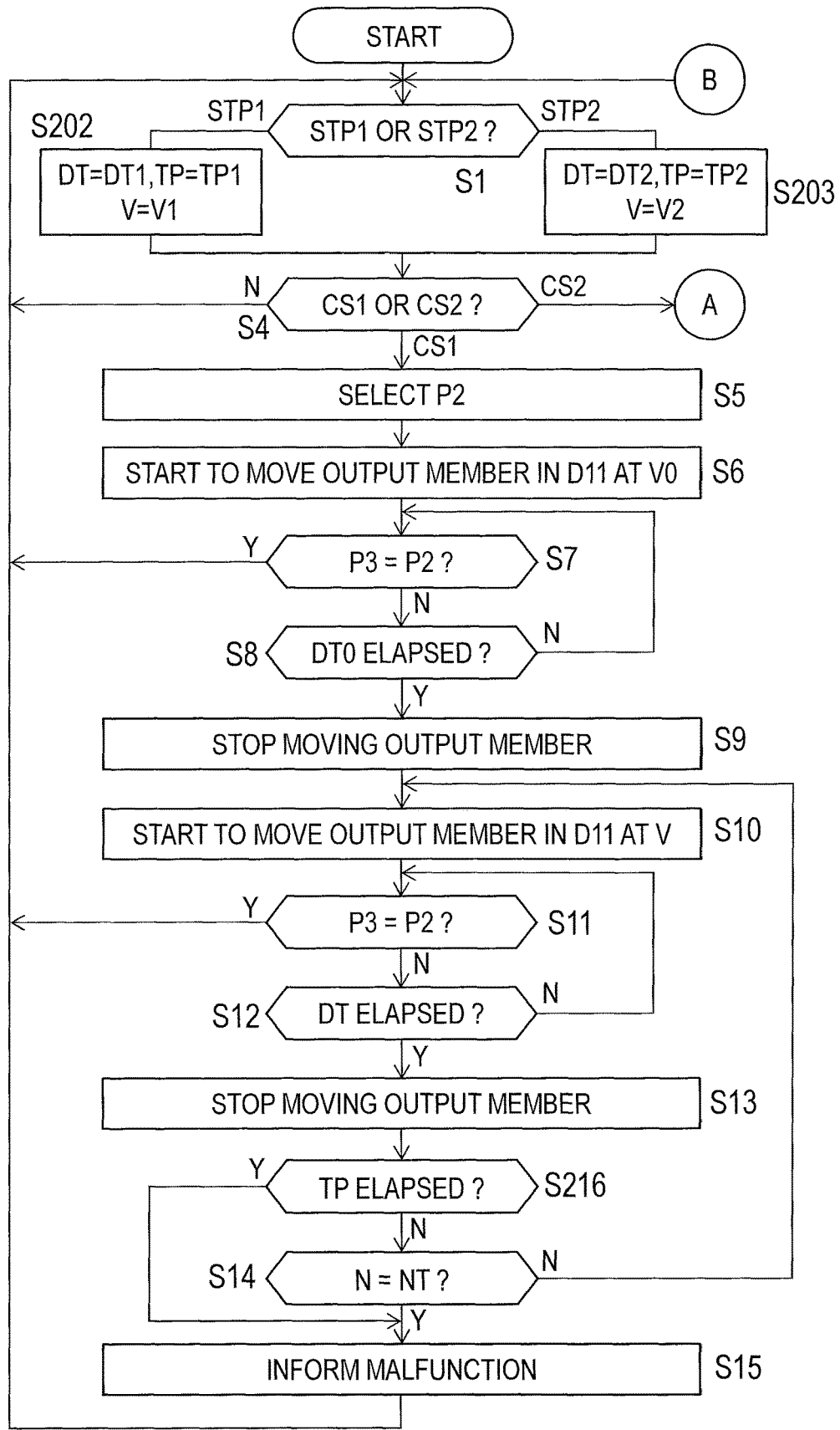
FIGS. 13 and 14 are flowcharts of control executed by the control device of the derailleur illustrated in FIG. 11.
Figure 14:
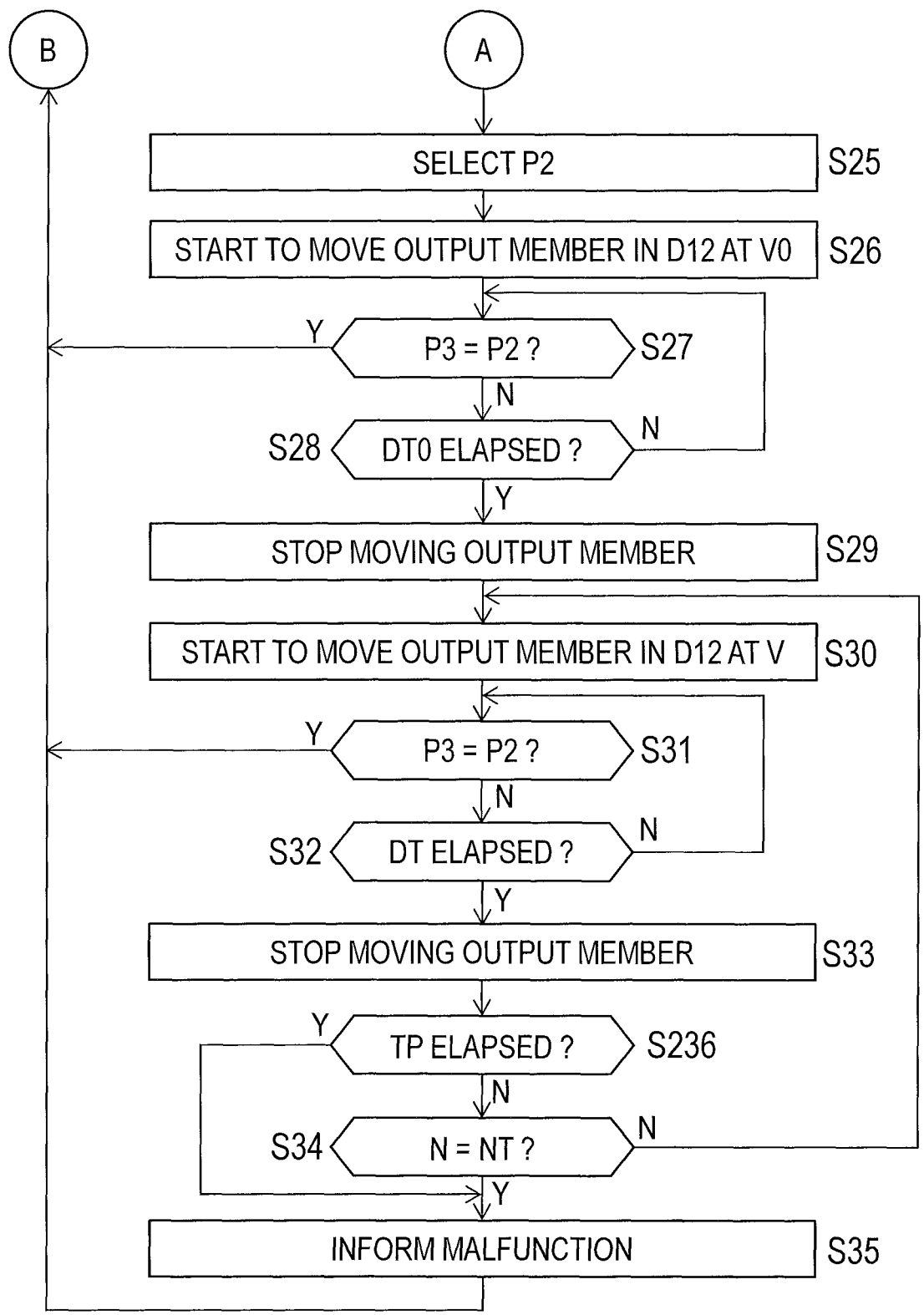

As seen in FIGS. 13 and 14, the control of the derailleur RD has substantially the same flowcharts as the flowcharts shown in FIGS. 9 and 10.

As seen in FIG. 13, it is determined by the controller 212 whether the electric power source PS is in the first power-supply state or the second power-supply state (step S1).

The first determination time period DT1 is stored in the memory 12M as a determination time period DT if the electric power source PS is in the first power-source state (steps S1 and S202). The first actuating time period TP1 is stored in the memory 12M as the actuating time period TP if the electric power source PS is in the first power-source state (steps S1 and S202). The first speed V1 is stored in the memory 12M as the applied speed V if the electric power source PS is in the first power-source state (steps S1 and S202).

The second determination time period DT2 is stored in the memory 12M as the determination time period DT (steps S1 and S203). The second actuating time period TP2 is stored in the memory 12M as the actuating time period TP if the electric power source PS is in the second power-source state (steps S1 and S203). The second speed V2 is stored in the memory 12M as the applied speed V if the electric power source PS is in the second power-source state (steps S1 and S203).

As seen in FIG. 13, the controller 212 executes the steps S4 to S13 as with the flowchart shown in FIG. 9. In the second embodiment, after the step S13, it is determined by the controller 212 whether the actuating time period TP has elapsed (step S216). The step S14 is executed by the controller 212 if the actuating time period TP has not elapsed (steps S216 and S14). The step S15 is executed by the controller 212 if the actuating time period TP has elapsed (steps S216 and S15).

As seen in FIG. 12, the first actuating time period TP1 is used as the actuating time period TP in the first state. The second actuating time period TP2 is used as the actuating time period TP in the second state.

As seen in FIGS. 13 and 14, as with the steps S5 to S15 and S216 of FIG. 13, the steps S25 to S35 and S236 depicted in FIG. 14 are executed by the controller 212 if the controller 212 receives the second control signal CS2 in the step S4 of FIG. 13. The steps S25 to S35 and S236 of FIG. 14 are substantially the same as the steps S5 to S15 and S216 of FIG. 13 except that the first actuating direction D11 is replaced with the second actuating direction D12. Thus, the description regarding the steps S5 to S15 and S216 can be utilized as the description regarding the steps S25 to S35 and S236 by replacing "first actuating direction D11" with "second actuating direction D12." The steps S25 to S35 will not be described in detail here for the sake of brevity.

Third Embodiment

A control device 310 in accordance with a third embodiment will be described below referring to FIGS. 15 to 17. The control device 310 has the same structure and/or configuration as those of the control device 10 except for the controller 12. Thus, elements having substantially the same function as those in the first and second embodiments will be numbered the same here and will not be described and/or illustrated again in detail here for the sake of brevity.

Figure 15:
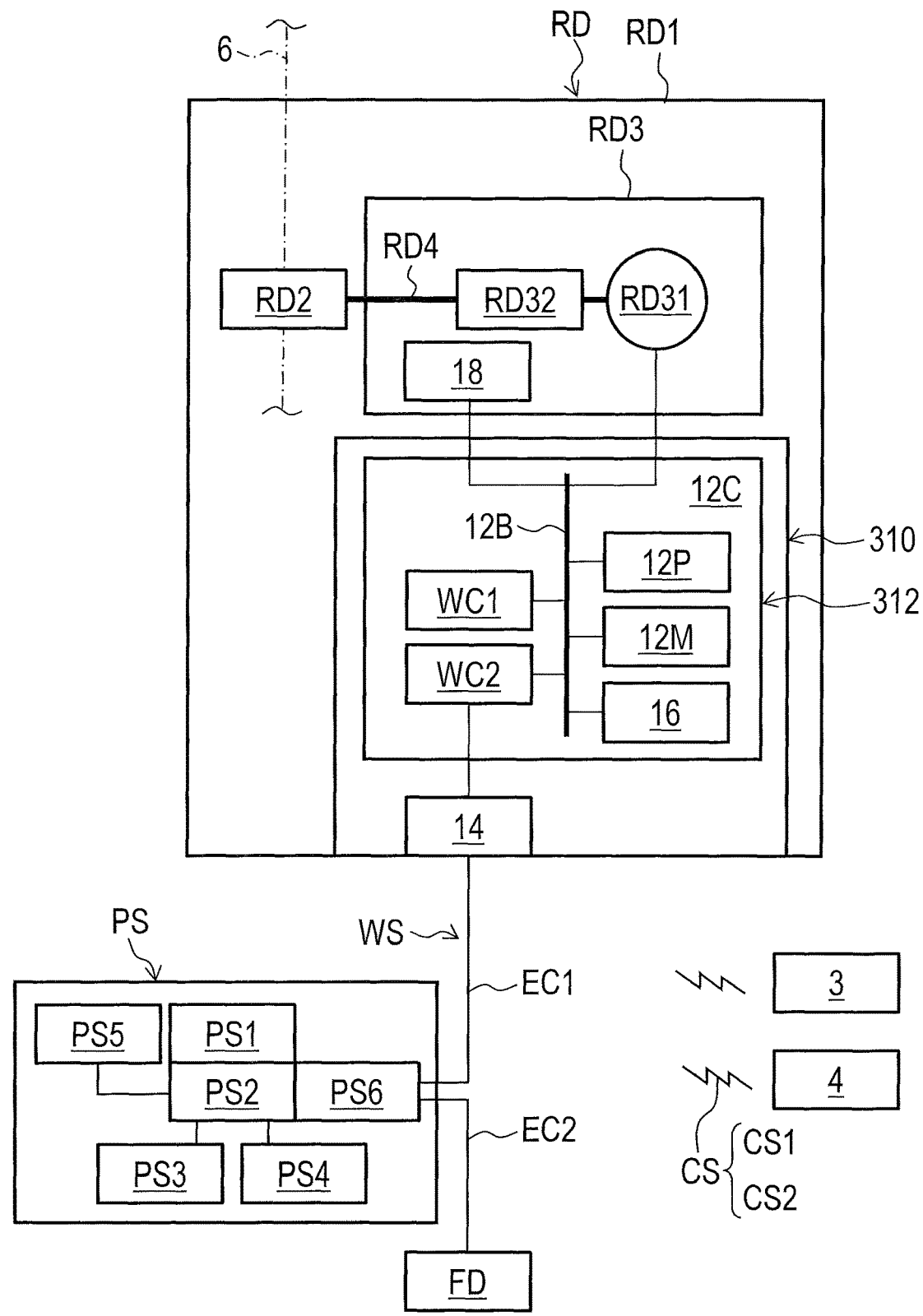
FIG. 15 is a schematic block diagram of a derailleur including a control device in accordance with a third embodiment.

As seen in FIG. 15, the control device 310 for the human-powered vehicle 2 comprises a controller 312. The controller 312 is configured to control the actuator RD3 to move the output member RD4 based on the control information. The controller 312 has substantially the same structure as the structure of the controller 12 described in the first embodiment.

Figure 16:
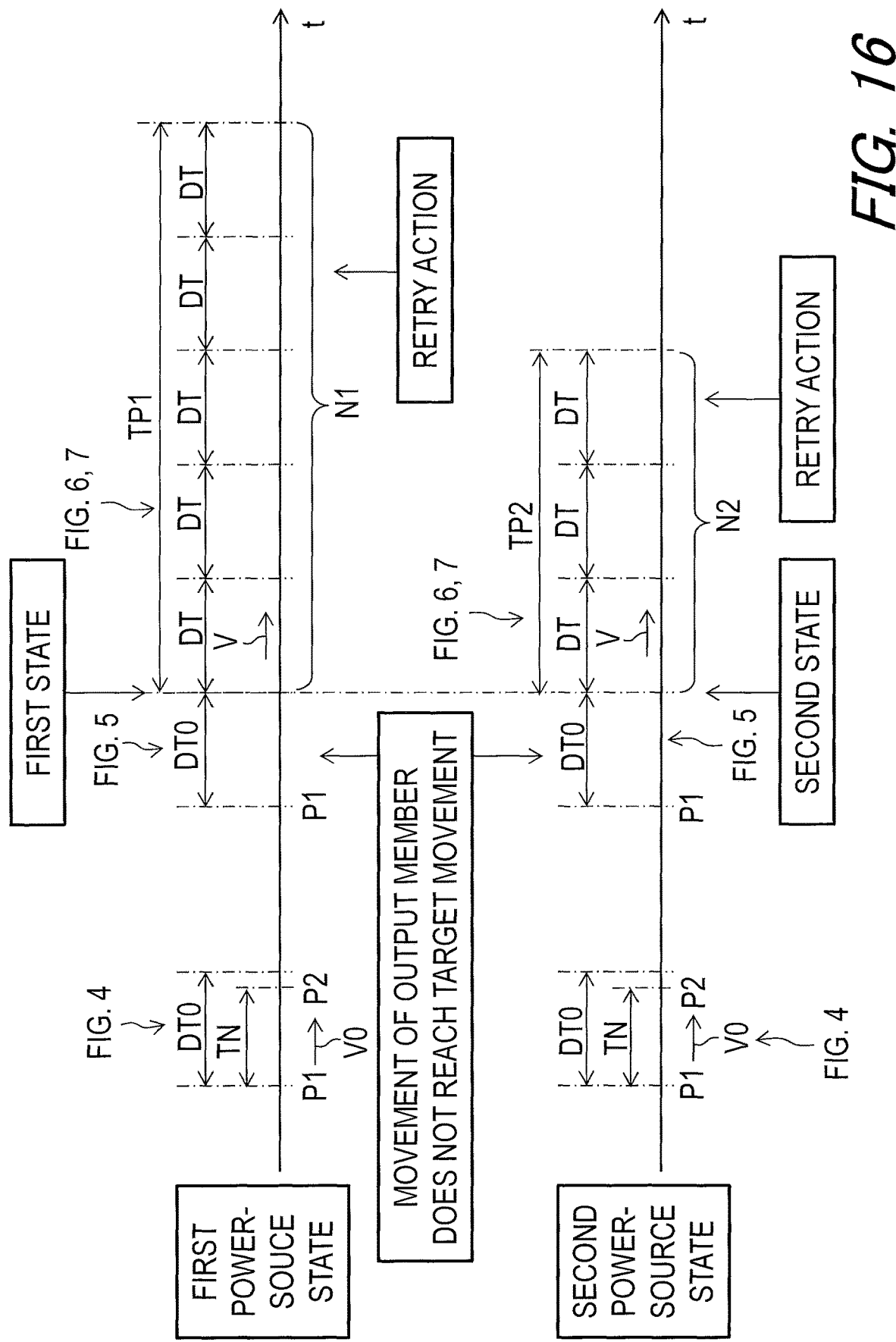
FIG. 16 is a schematic view showing an actuating manner of an actuator of the derailleur illustrated in FIG. 15 in each of a first state and a second state.

As seen in FIG. 16, the controller 312 is configured to control the actuator RD3 to move the output member RD4 in a first actuating manner in a first state where the electric power source PS configured to supply electricity to the actuator RD3 is in the first power-source state and where the movement of the output member RD4 does not reach the target movement after the controller 312 controls the actuator RD3 based on the control information. The controller 312 is configured to control the actuator RD3 to move the output member RD4 in a second actuating manner different from the first actuating manner in a second state where the electric power source PS is in the second power-source state different from the first power-source state and where the movement of the output member RD4 does not reach the target movement after the controller 312 controls the actuator RD3 based on the control information.

The controller 312 is configured to control the actuator RD3 to move the output member RD4 at the first number of times N1 during the actuating time period TP in the first state. The controller 312 is configured to control the actuator RD3 to move the output member RD4 at the second number of times N2 different from the first number of times N1 during the actuating time period TP in the second state. In the third embodiment, the second number of times N2 is smaller than the first number of times N1. However, the second number of times N2 can be greater than or equal to the first number of times N1 if needed and/or desired.

The actuating time period TP includes the first actuating time period TP1 and the second actuating time period TP2 different from the first actuating time period TP1. The controller 312 is configured to control the actuator RD3 to move the output member RD4 at the first number of times N1 during the first actuating time period TP1 in the first state. The controller 312 is configured to control the actuator RD3 to move the output member RD4 at the second number of times N2 during the second actuating time period TP2 in the second state. In the third embodiment, the second actuating time period TP2 is shorter than the first actuating time period TP1. However, the second actuating time period TP2 can be longer than or equal to the first actuating time period TP1 if needed and/or desired.

Figure 17:
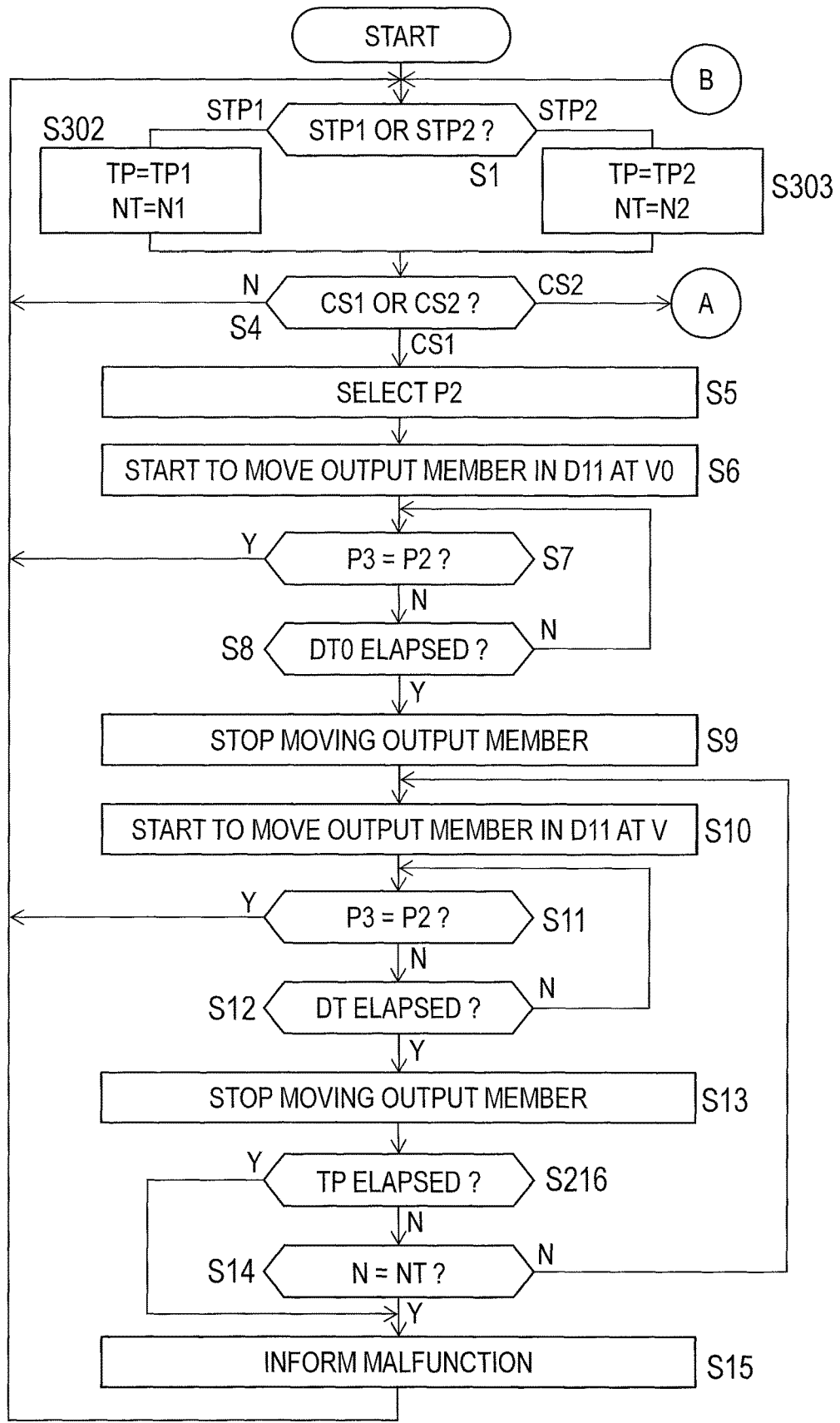
FIG. 17 is a flowchart of control executed by the control device of the derailleur illustrated in FIG. 15.

As seen in FIG. 17, the control of the derailleur RD has substantially the same flowchart as the flowchart shown in FIG. 13. The flowchart shown in FIG. 14 can be utilized as the flowchart continued from FIG. 17.

As seen in FIG. 17, it is determined by the controller 12 whether the electric power source PS is in the first power-supply state or the second power-supply state (step S1).

The first actuating time period TP1 is stored in the memory 12M as the actuating time period TP if the electric power source PS is in the first power-source state (steps S1 and S302). The first number of times N1 is stored in the memory 12M as the determination number of times NT if the electric power source PS is in the first power-source state (steps S1 and S302).

The second actuating time period TP2 is stored in the memory 12M as the actuating time period TP if the electric power source PS is in the second power-source state (steps S1 and S303). The second number of times N2 is stored in the memory 12M as the determination number of times NT if the electric power source PS is in the second power-source state (steps S1 and S303).

As seen in FIG. 16, the determination time period DT in the first state is equal to the determination time period DT in the second state. Thus, the initial determination time period DT0, the first determination time period DT1, the second determination time period DT2, or another default determination time period is stored in the memory 12M as the determination time period DT. However, the determination time period DT in the first state can be different from the determination time period DT in the second state if needed and/or desired.

The applied speed V in the first state is equal to the applied speed V in the second state. Thus, the initial speed V0, the first speed V1, the second speed V2, or another default speed is stored in the memory 12M as the applied speed V. However, the applied speed V in the first state can be different from the applied speed V in the second state if needed and/or desired.

As seen in FIG. 17, the controller 312 executes the steps S4 to S13 as with the flowchart shown in FIG. 13. In the third embodiment, after the step S13, it is determined by the controller 312 whether the actuating time period TP has elapsed (step S216). The step S14 is executed by the controller 312 if the actuating time period TP has not elapsed (steps S216 and S14). The step S15 is executed by the controller 312 if the actuating time period TP has elapsed (steps S216 and S15).

As seen in FIG. 16, the first actuating time period TP1 is used as the actuating time period TP in the first state. The second actuating time period TP2 is used as the actuating time period TP in the second state. The first number of times N1 is used as the determination number of times NT in the first state. The second number of times N2 is used as the determination number of times NT in the second state.

As seen in FIGS. 17 and 14, as with the steps S5 to S15 and S216 of FIG. 17, the steps S25 to S35 and S236 of FIG. 14 are executed by the controller 312 if the controller 312 receives the second control signal CS2 in the step S4 of FIG. 17. The steps S25 to S35 and S236 of FIG. 14 are substantially the same as the steps S5 to S15 and S216 of FIG. 17 except that the first actuating direction D11 is replaced with the second actuating direction D12. Thus, the description regarding the steps S5 to S15 and S216 can be utilized as the description regarding the steps S25 to S35 and S236 by replacing "first actuating direction D11" with "second actuating direction D12." The steps S25 to S35 will not be described in detail here for the sake of brevity.

Fourth Embodiment

A control device 410 in accordance with a fourth embodiment will be described below referring to FIGS. 18 to 20. The control device 410 has the same structure and/or configuration as those of the control device 10 except for the controller 12. Thus, elements having substantially the same function as those in the first to third embodiments will be numbered the same here and will not be described and/or illustrated again in detail here for the sake of brevity.

Figure 18:
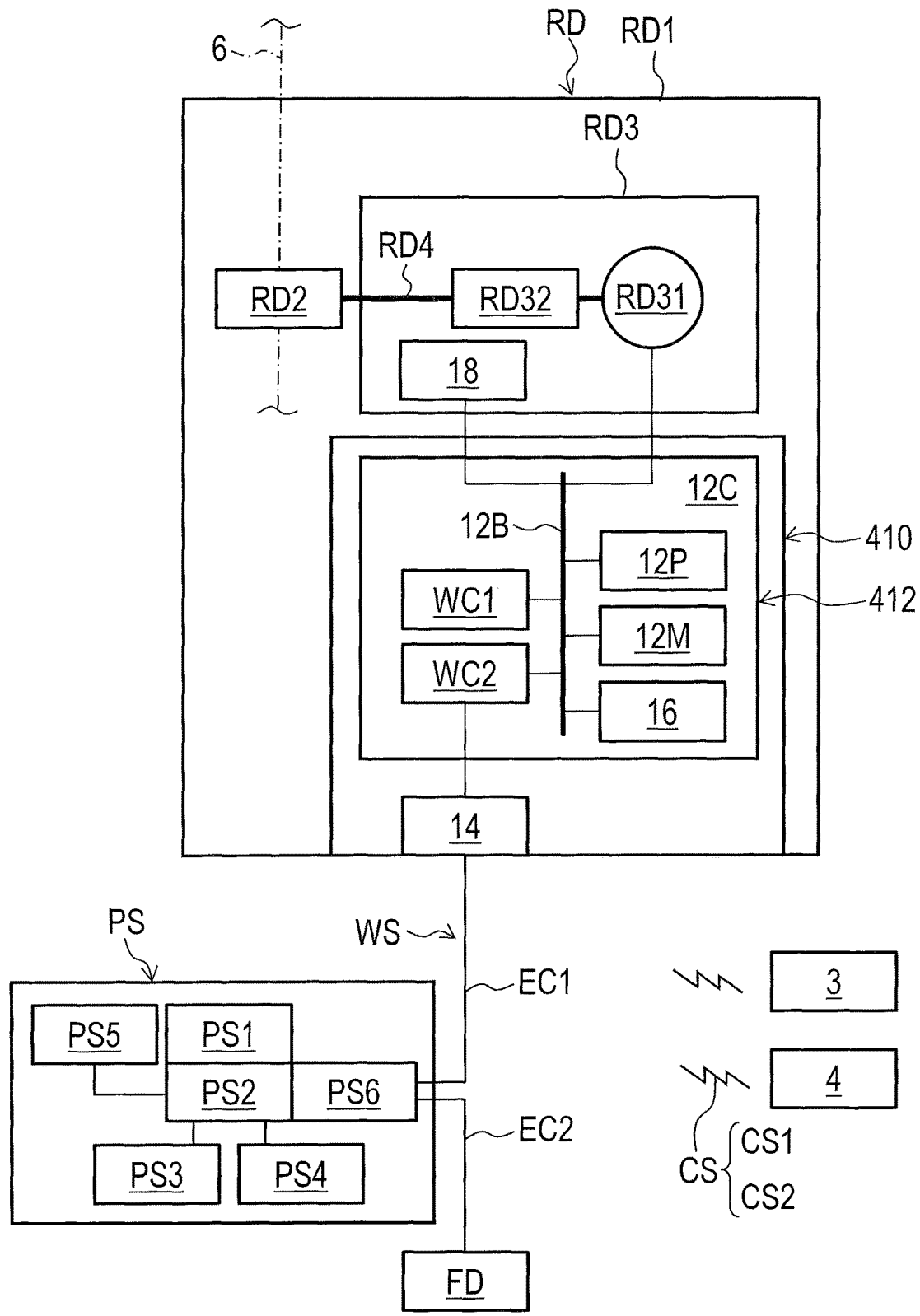
FIG. 18 is a schematic block diagram of a derailleur including a control device in accordance with a fourth embodiment.

As seen in FIG. 18, the control device 410 for the human-powered vehicle 2 comprises a controller 412. The controller 412 is configured to control the actuator RD3 to move the output member RD4 based on the control information. The controller 412 has substantially the same structure as the structure of the controller 12 described in the first embodiment.

Figure 19:
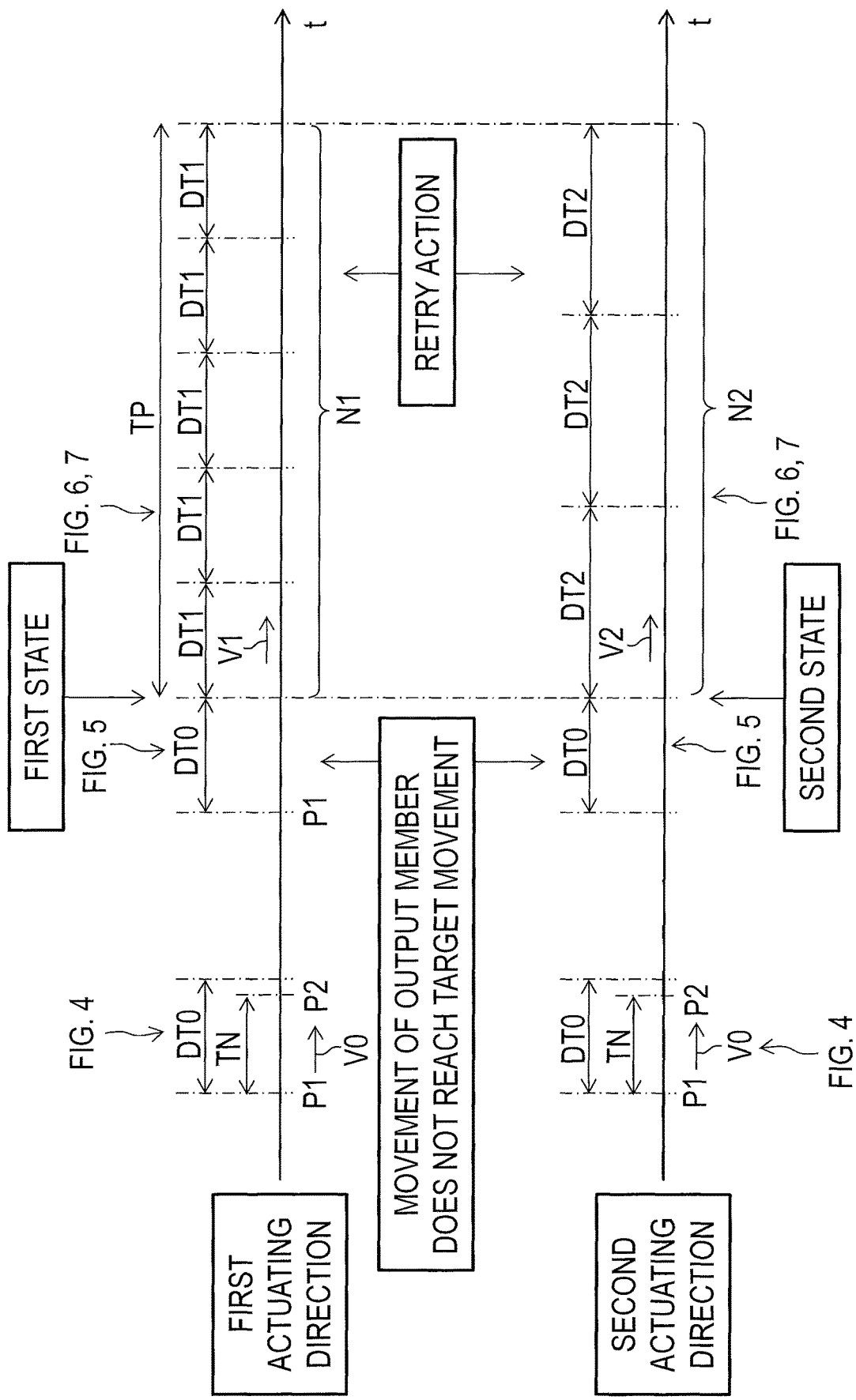
FIG. 19 is a schematic view showing an actuating manner of an actuator of the derailleur illustrated in FIG. 18 in each of a first state and a second state.

As seen in FIG. 19, the controller 412 is configured to change an actuating manner of the actuator RD3 depending on an actuating direction in which the actuator RD3 moves the output member RD4 since the actuating direction affects power consumption in the derailleur RD.

As seen in FIG. 3, the first actuating direction D11 is a direction in which power consumption of the actuator RD3 is first power consumption. The second actuating direction D12 is a direction in which the power consumption of the actuator RD3 is second power consumption. The actuator RD3 presses the chain 6 against one of the sprockets RS1 to RS12 to facilitate the gear changing when the actuator RD3 moves the output member RD4 in the second actuating direction D12. Thus, the second power consumption is higher than the first power consumption. The actuator RD3 uses the first power consumption while the actuator RD3 moves the output member RD4 by one gear stage in the first actuating direction D11. The actuator RD3 uses the second power consumption while the actuator RD3 moves the output member RD4 by one gear stage in the second actuating direction D12.

As seen in FIG. 19, the controller 412 is configured to control the actuator RD3 to move the output member RD4 in a first actuating manner in a first actuator state where the control information indicates the first actuating direction D11 of the actuator RD3 and where the movement of the output member RD4 does not reach the target movement after the controller 412 controls the actuator RD3 based on the control information. The first actuator state can also be referred to as a third state.

The controller 412 is configured to control the actuator RD3 to move the output member RD4 in a second actuating manner different from the first actuating manner in a second actuator state where the control information indicates the second actuating direction D12 of the actuator RD3 different from the first actuating direction D11 and where the movement of the output member RD4 does not reach the target movement after the controller 412 controls the actuator RD3 based on the control information. The second actuator state can also be referred to as a fourth state.

In the fourth embodiment, the controller 412 is configured to determine whether the control information indicates the first actuating direction D11 or the second actuating direction D12 based on the control signal CS (e.g., the first control signal CS1, the second control signal CS2). However, the controller 412 can be configured to determine whether the control information indicates the first actuating direction D11 or the second actuating direction D12 based on other information.

The controller 412 is configured to control the actuator RD3 to move the output member RD4 at the first number of times N1 during the actuating time period TP in the first actuator state. The controller 412 is configured to control the actuator RD3 to move the output member RD4 at second number of times N2 different from the first number of times N1 during the actuating time period TP in the second actuator state.

In the fourth embodiment, the second number of times N2 is smaller than the first number of times N1. The actuating time period TP in the first actuator state is equal to the actuating time period TP in the second actuator state. However, the second number of times N2 can be greater than or equal to the first number of times N1 if needed and/or desired. The actuating time period TP in the first actuator state can be different from the actuating time period TP in the second actuator state if needed and/or desired.

Figure 20:
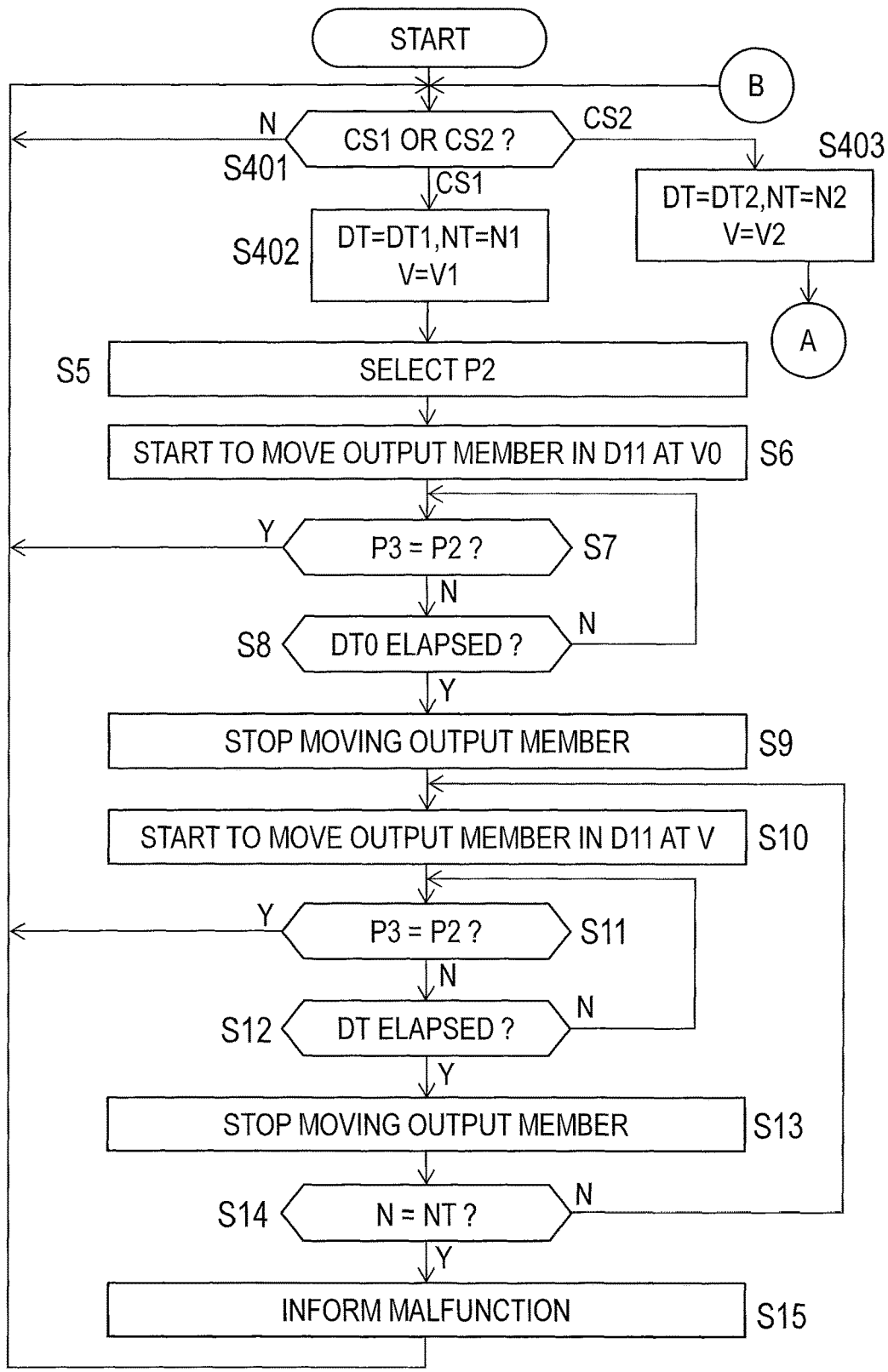
FIG. 20 is a flowchart of control executed by the control device of the derailleur illustrated in FIG. 18.

As seen in FIG. 20, the control of the derailleur RD has substantially the same flowchart as the flowchart shown in FIG. 9. The flowchart shown in FIG. 10 can be utilized as the flowchart continued from FIG. 20.

As seen in FIG. 20, it is not determined by the controller 412 whether the electric power source PS is in the first power-supply state or the second power-supply state. As with the step S4 of FIG. 9, it is determined by the controller 412 whether the controller 412 receives the control information (step S401). Specifically, it is determined by the controller 412 whether the controller 412 receives the first control signal CS1 or the second control signal CS2 via the wireless communicator WC1.

The first determination time period DT1 is stored in the memory 12M as the determination time period DT if the controller 412 receives the first control signal CS1 via the wireless communicator WC1 (steps S401 and S402). The first number of times N1 is stored in the memory 12M as the determination number of times NT if the controller 412 receives the first control signal CS1 via the wireless communicator WC1 (steps S401 and S402). The first speed V1 is stored in the memory 12M as the applied speed V if the controller 412 receives the first control signal CS1 via the wireless communicator WC1 (steps S401 and S402). The step S401 is repeatedly executed by the controller 412 until the controller 412 receives one of the first control signal CS1 and the second control signal CS2 (step S401).

The second determination time period DT2 is stored in the memory 12M as the determination time period DT if the controller 412 receives the second control signal CS2 via the wireless communicator WC1 (steps S401 and S403). The second number of times N2 is stored in the memory 12M as the determination number of times NT if the controller 412 receives the second control signal CS2 via the wireless communicator WC1 (steps S401 and S403). The second speed V2 is stored in the memory 12M as the applied speed V if the controller 412 receives the second control signal CS2 via the wireless communicator WC1 (steps S401 and S403).

Steps S5 to S15 are executed by the controller 412 if the controller 412 receives the first control signal CS1. Steps S25 to 35 depicted in FIG. 10 are executed by the controller 412 if the controller 412 receives the second control signal CS2. The description regarding the steps S5 to S15 can be utilized as the description regarding the steps S25 to S35 by replacing "first actuating direction D11" with "second actuating direction D12." Thus, the steps S25 to S35 will not be described in detail here for the sake of brevity.

Fifth Embodiment

A control device 510 in accordance with a fifth embodiment will be described below referring to FIGS. 21 to 23. The control device 510 has the same structure and/or configuration as those of the control device 410 except for the controller 412. Thus, elements having substantially the same function as those in the first to fourth embodiments will be numbered the same here and will not be described and/or illustrated again in detail here for the sake of brevity.

Figure 21:
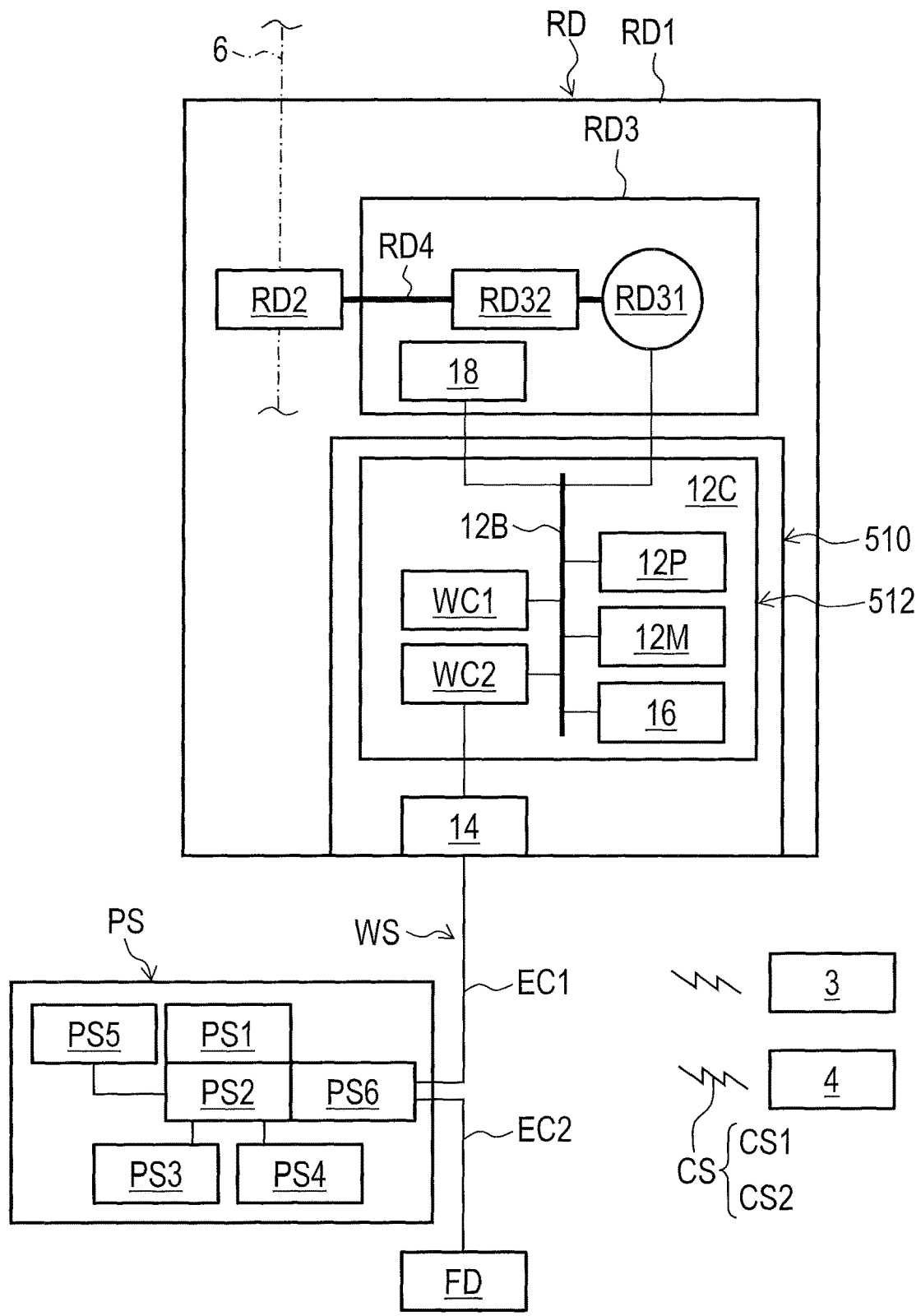
FIG. 21 is a schematic block diagram of a derailleur including a control device in accordance with a fifth embodiment.

As seen in FIG. 21, the control device 510 for the human-powered vehicle 2 comprises a controller 512. The controller 512 is configured to control the actuator RD3 to move the output member RD4 based on the control information. The controller 512 has substantially the same structure as the structure of the controller 412 described in the fourth embodiment.

Figure 22:
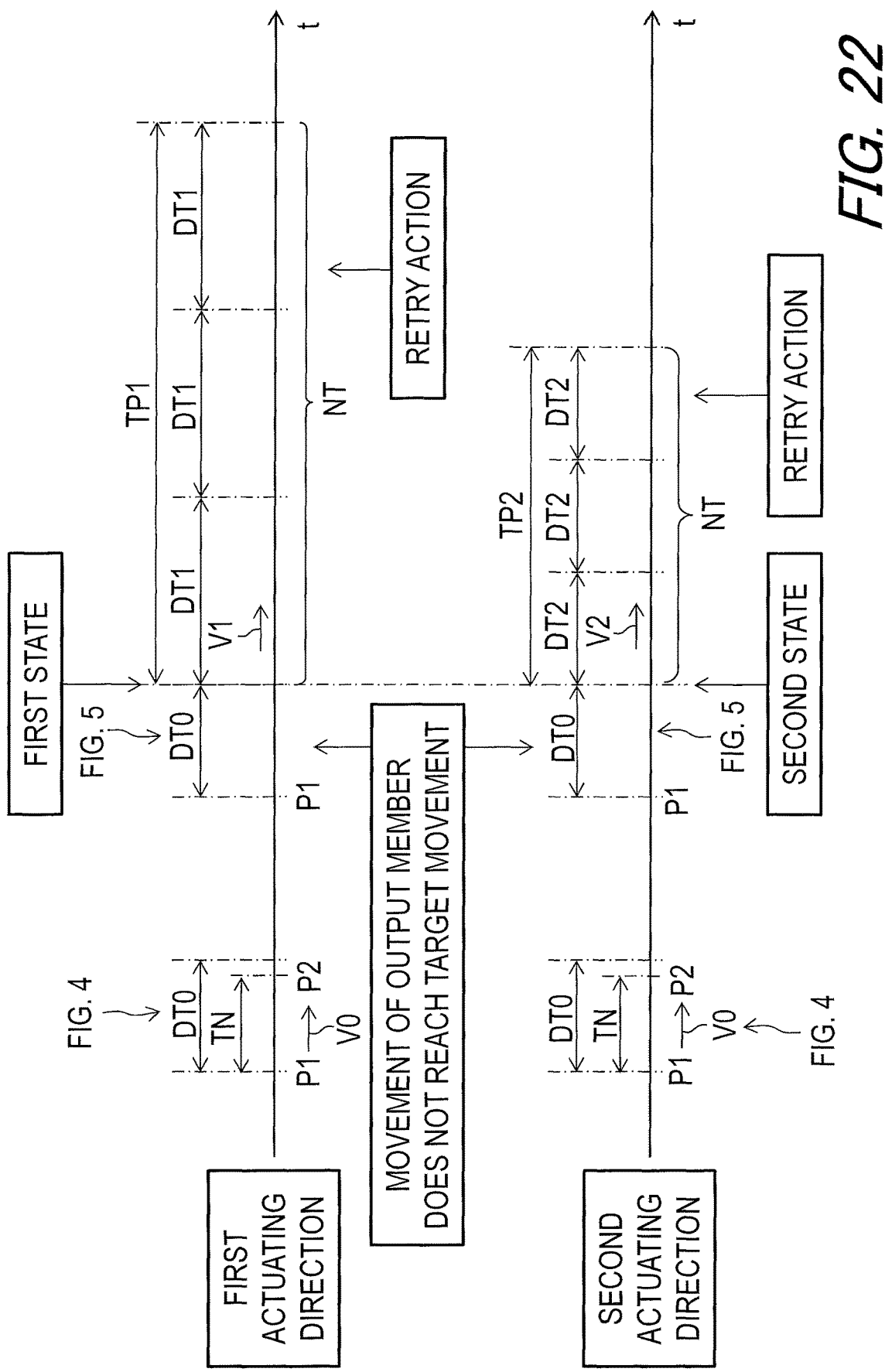
FIG. 22 is a schematic view showing an actuating manner of an actuator of the derailleur illustrated in FIG. 21 in each of a first state and a second state.

As seen in FIG. 22, the controller 512 is configured to control the actuator RD3 to move the output member RD4 in a first actuating manner in a first actuator state where the control information indicates the first actuating direction D11 of the actuator RD3 and where the movement of the output member RD4 does not reach the target movement after the controller 512 controls the actuator RD3 based on the control information. The first actuator state can also be referred to as a third state.

The controller 512 is configured to control the actuator RD3 to move the output member RD4 in a second actuating manner different from the first actuating manner in a second actuator state where the control information indicates the second actuating direction D12 of the actuator RD3 different from the first actuating direction D11 and where the movement of the output member RD4 does not reach the target movement after the controller 512 controls the actuator RD3 based on the control information. The second actuator state can also be referred to as a fourth state.

In the fifth embodiment, the controller 512 is configured to determine whether the control information indicates the first actuating direction D11 or the second actuating direction D12 based on the control signal CS (e.g., the first control signal CS1, the second control signal CS2). However, the controller 512 can be configured to determine whether the control information indicates the first actuating direction D11 or the second actuating direction D12 based on other information.

The controller 512 is configured to control the actuator RD3 to move the output member RD4 during the first actuating time period TP1 in the first actuator state. The controller 512 is configured to control the actuator RD3 to move the output member RD4 during the second actuating time period TP2 different from the first actuating time period TP1 in the second actuator state. In the fifth embodiment, the second actuating time period TP2 is shorter than the first actuating time period TP1. However, the second actuating time period TP2 can be longer than or equal to the first actuating time period TP1 if needed and/or desired.

The controller 512 is configured to control the actuator RD3 to move the output member RD4 at the determination number of times NT during the first actuating time period TP1 in the first state. The controller 512 is configured to control the actuator RD3 to move the output member RD4 at the determination number of times NT during the second actuating time period TP2 different from the first actuating time period TP1 in the second state. However, the determination number of times NT in the first state can be different from the total number of times in the second state if needed and/or desired.

Figure 23:
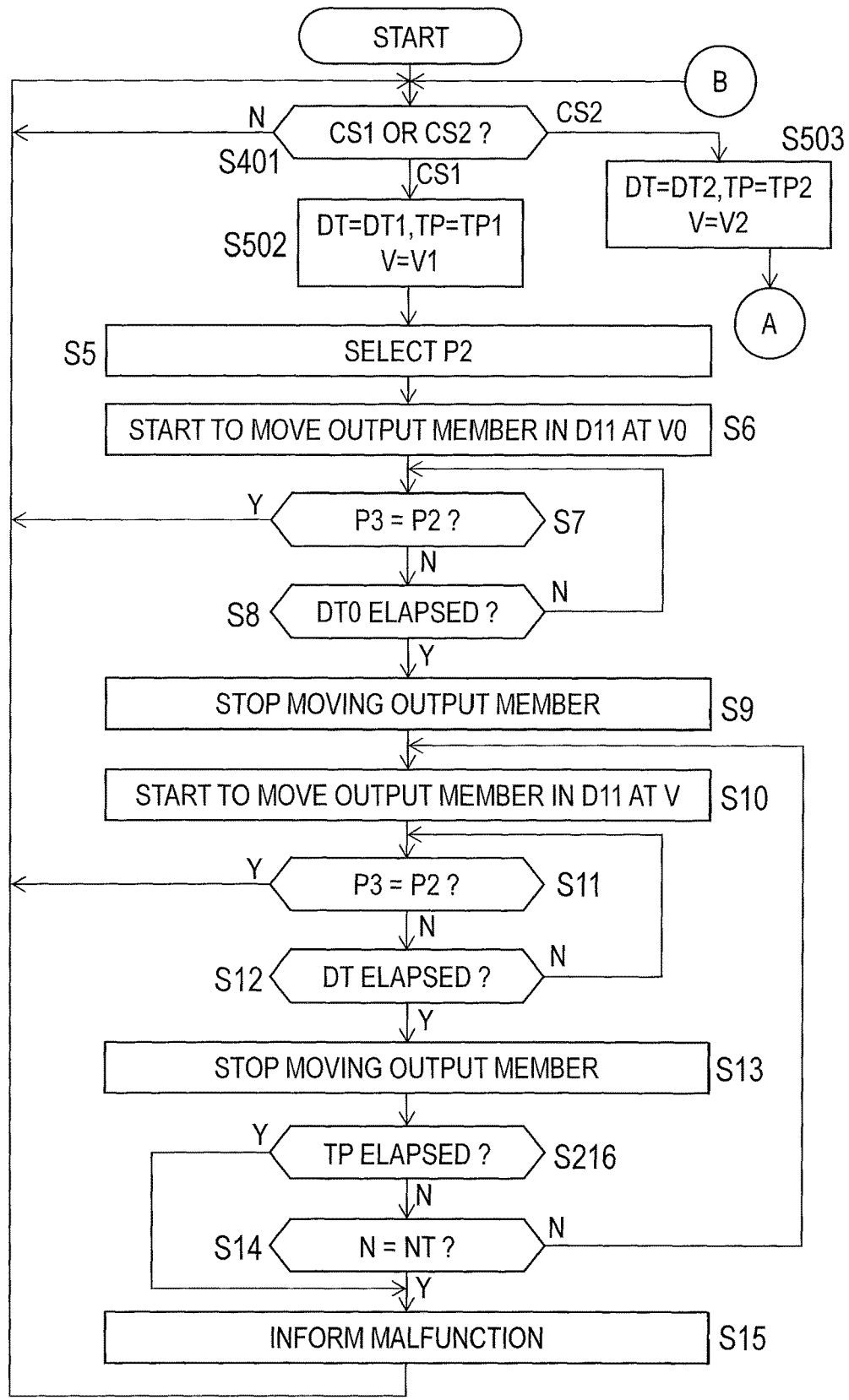
FIG. 23 is a flowchart of control executed by the control device of the derailleur illustrated in FIG. 21.

As seen in FIG. 23, the control of the derailleur RD has substantially the same flowchart as the flowchart shown in FIG. 13. The flowchart shown in FIG. 14 can be utilized as the flowchart continued from FIG. 23.

As seen in FIG. 23, it is not determined by the controller 512 whether the electric power source PS is in the first power-supply state or the second power-supply state. As with the step S4 of FIG. 13, it is determined by the controller 512 whether the controller 512 receives the control information (step S401). Specifically, it is determined by the controller 512 whether the controller 512 receives the first control signal CS1 or the second control signal CS2 via the wireless communicator WC1. The step S401 is repeatedly executed by the controller 512 until the controller 512 receives one of the first control signal CS1 and the second control signal CS2 (step S401).

The first determination time period DT1 is stored in the memory 12M as the determination time period DT if the controller 512 receives the first control signal CS1 via the wireless communicator WC1 (steps S401 and S502). The first actuating time period TP1 is stored in the memory 12M as the actuating time period TP if the electric power source PS is in the first power-source state (steps S401 and S502). The first speed V1 is stored in the memory 12M as the applied speed V if the controller 512 receives the first control signal CS1 via the wireless communicator WC1 (steps S401 and S502).

The second determination time period DT2 is stored in the memory 12M as the determination time period DT if the controller 512 receives the second control signal CS2 via the wireless communicator WC1 (steps S401 and S503). The second actuating time period TP2 is stored in the memory 12M as the actuating time period TP if the electric power source PS is in the second power-source state (steps S401 and S503). The second speed V2 is stored in the memory 12M as the applied speed V if the controller 512 receives the second control signal CS2 via the wireless communicator WC1 (steps S401 and S503).

The steps S5 to S15 and S216 shown in FIG. 23 are executed by the controller 512 if the controller 512 receives the first control signal CS1. The steps S25 to 35 shown in FIG. 14 are executed by the controller 512 if the controller 512 receives the second control signal CS2 in the step S401 of FIG. 23. The description regarding the steps S5 to S15 and S216 described in the first embodiment can be utilized as the description regarding the steps S5 to S15 and S216 shown in FIG. 23. The description regarding the steps S5 to S15 and S216 described in the first embodiment can be utilized as the description regarding the steps S25 to S35 and S236 shown in FIG. 14, which are continued from the step S401 of FIG. 23, by replacing "first actuating direction D11" with "second actuating direction D12." Thus, the steps S25 to S35 will not be described in detail here for the sake of brevity.

Sixth Embodiment

A control device 610 in accordance with a sixth embodiment will be described below referring to FIGS. 24 to 26. The control device 610 has the same structure and/or configuration as those of the control device 410 except for the controller 412. Thus, elements having substantially the same function as those in the first to fourth embodiments will be numbered the same here and will not be described and/or illustrated again in detail here for the sake of brevity.

Figure 24:
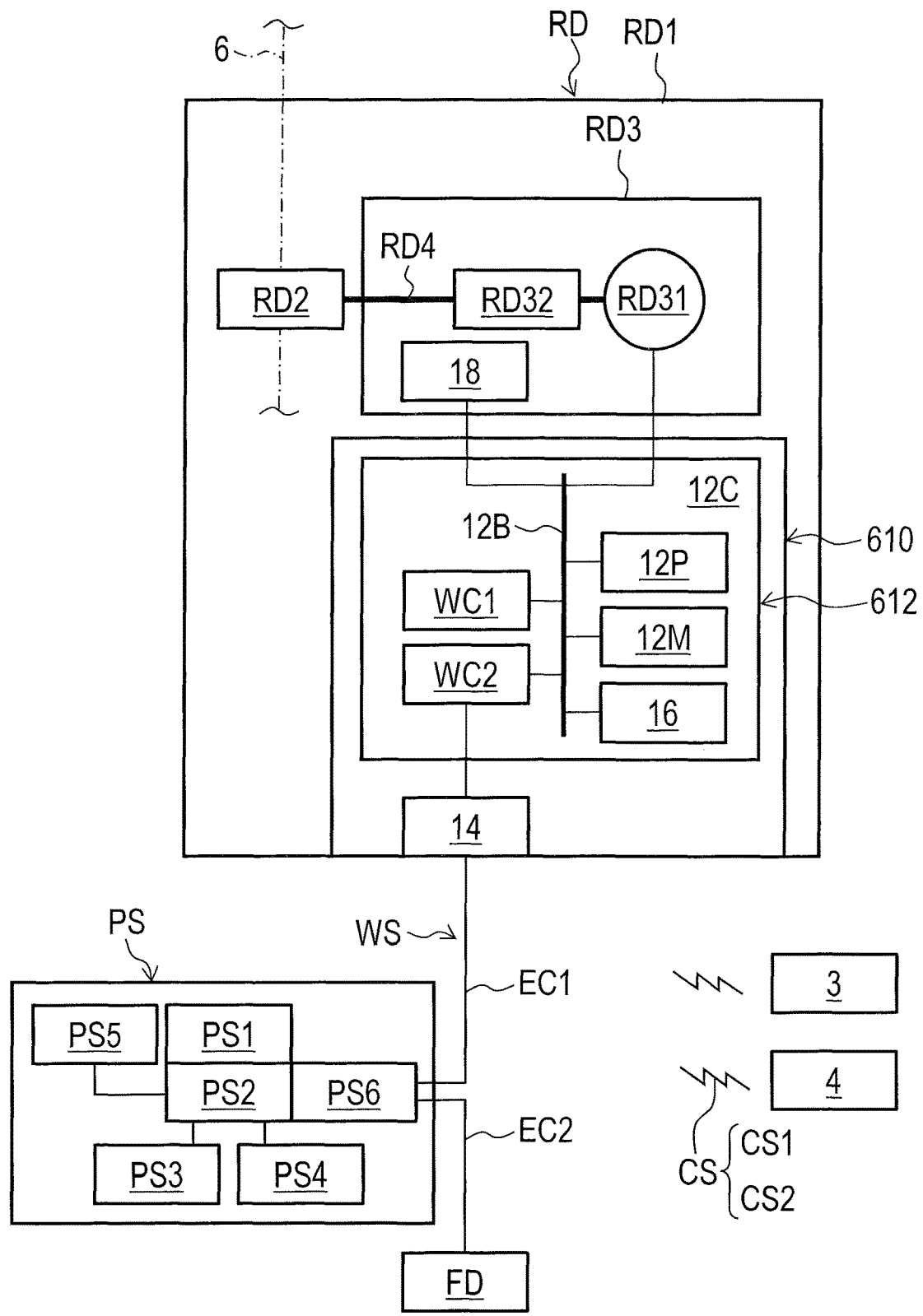
FIG. 24 is a schematic block diagram of a derailleur including a control device in accordance with a sixth embodiment.

As seen in FIG. 24, the control device 610 for the human-powered vehicle 2 comprises a controller 612. The controller 612 is configured to control the actuator RD3 to move the output member RD4 based on the control information. The controller 612 has substantially the same structure as the structure of the controller 412 described in the fourth embodiment.

Figure 25:
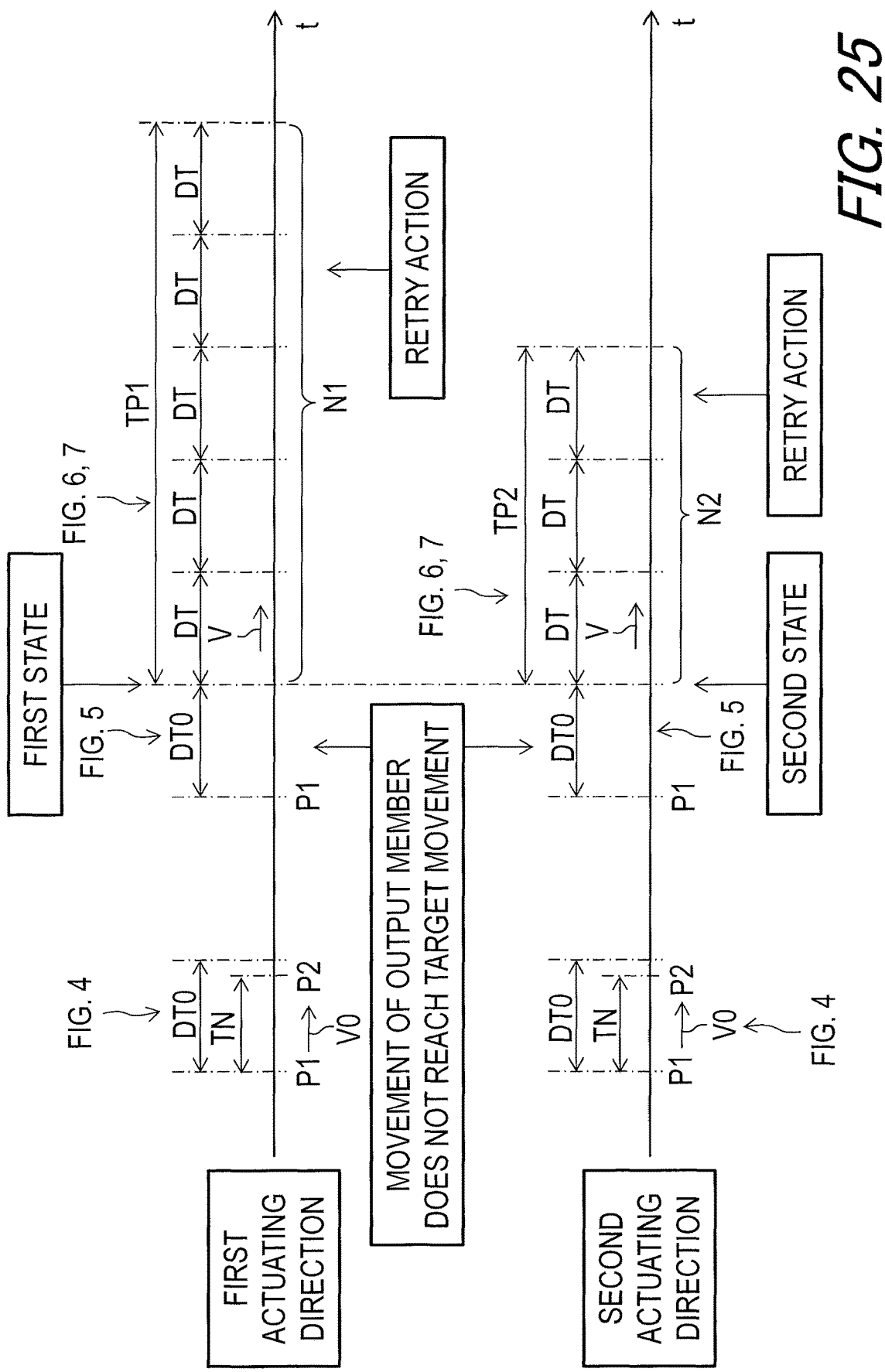
FIG. 25 is a schematic view showing an actuating manner of an actuator of the derailleur illustrated in FIG. 24 in each of a first state and a second state.

As seen in FIG. 25, the controller 612 is configured to control the actuator RD3 to move the output member RD4 in a first actuating manner in a first actuator state where the control information indicates the first actuating direction D11 of the actuator RD3 and where the movement of the output member RD4 does not reach the target movement after the controller 612 controls the actuator RD3 based on the control information. The first actuator state can also be referred to as a third state.

The controller 612 is configured to control the actuator RD3 to move the output member RD4 in a second actuating manner different from the first actuating manner in a second actuator state where the control information indicates the second actuating direction D12 of the actuator RD3 different from the first actuating direction D11 and where the movement of the output member RD4 does not reach the target movement after the controller 612 controls the actuator RD3 based on the control information. The second actuator state can also be referred to as a fourth state.

In the sixth embodiment, the controller 612 is configured to determine whether the control information indicates the first actuating direction D11 or the second actuating direction D12 based on the control signal CS (e.g., the first control signal CS1, the second control signal CS2). However, the controller 612 can be configured to determine whether the control information indicates the first actuating direction D11 or the second actuating direction D12 based on other information.

The controller 612 is configured to control the actuator RD3 to move the output member RD4 at the first number of times N1 during the actuating time period TP in the first actuator state. The controller 612 is configured to control the actuator RD3 to move the output member RD4 at the second number of times N2 different from the first number of times N1 during the actuating time period TP in the second actuator state. In the sixth embodiment, the second number of times N2 is smaller than the first number of times N1. However, the second number of times N2 can be greater than or equal to the first number of times N1 if needed and/or desired.

The actuating time period TP includes a first actuating time period TP1 and a second actuating time period TP2 different from the first actuating time period TP1. The controller 612 is configured to control the actuator RD3 to move the output member RD4 at the first number of times N1 during the first actuating time period TP1 in the first actuator state. The controller 612 is configured to control the actuator RD3 to move the output member RD4 at the second number of times N2 during the second actuating time period TP2 in the second actuator state. In the sixth embodiment, the second actuating time period TP2 is shorter than the first actuating time period TP1. However, the second actuating time period TP2 can be longer than or equal to the first actuating time period TP1 if needed and/or desired.

Figure 26:
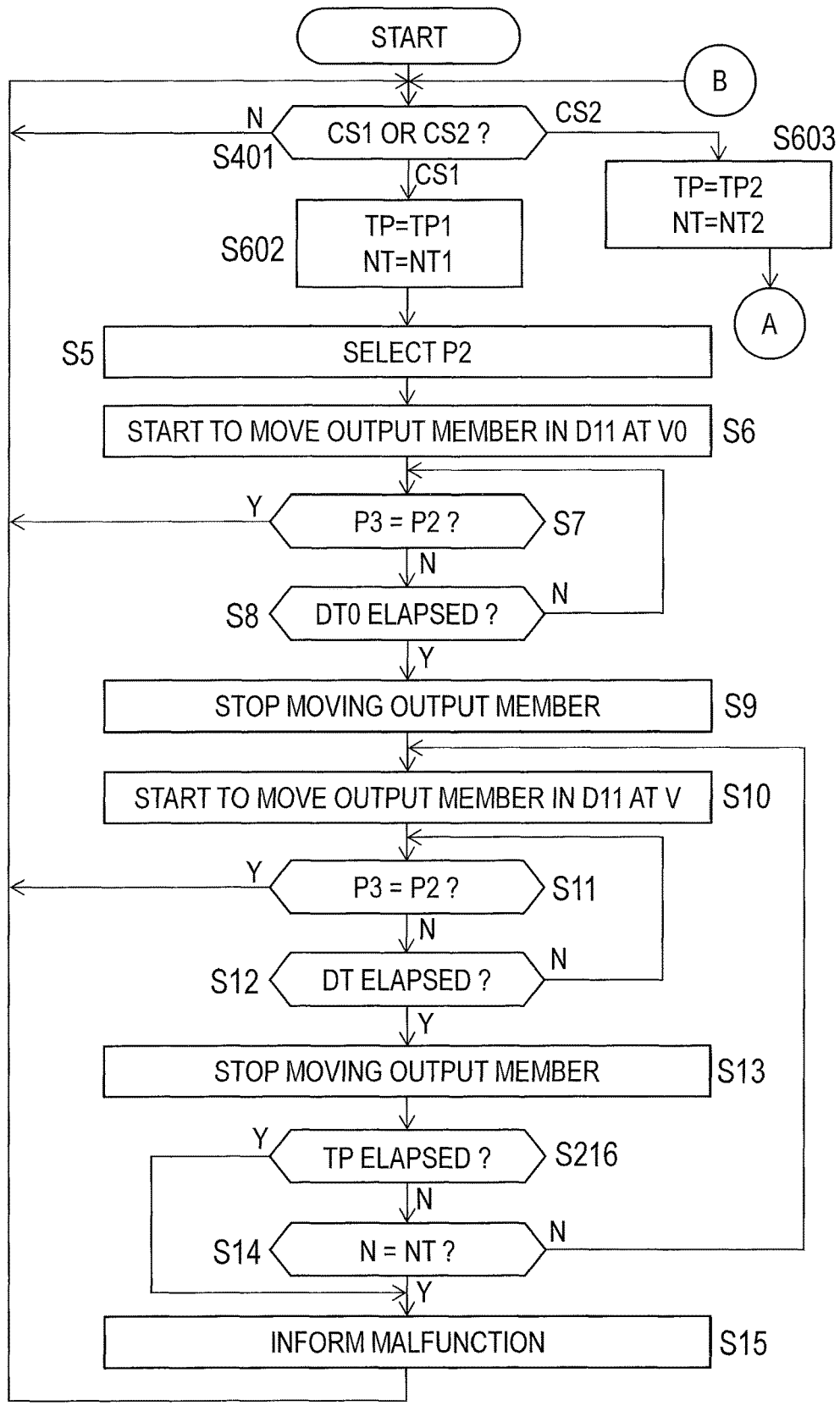
FIG. 26 is a flowchart of control executed by the control device of the derailleur illustrated in FIG. 24.

As seen in FIG. 26, the control of the derailleur RD has substantially the same flowchart as the flowchart shown in FIG. 13. The flowchart shown in FIG. 14 can be utilized as the flowchart continued from FIG. 26.

As seen in FIG. 26, it is not determined by the controller 612 whether the electric power source PS is in the first power-supply state or the second power-supply state. As with the step S4 of FIG. 13, it is determined by the controller 612 whether the controller 612 receives the control information (step S401). Specifically, it is determined by the controller 612 whether the controller 612 receives the first control signal CS1 or the second control signal CS2 via the wireless communicator WC1. The step S401 is repeatedly executed by the controller 612 until the controller 612 receives one of the first control signal CS1 and the second control signal CS2 (step S401).

The first actuating time period TP1 is stored in the memory 12M as the actuating time period TP if the electric power source PS is in the first power-source state (steps S401 and S602). The first number of times N1 is stored in the memory 12M as the determination number of times NT if the electric power source PS is in the first power-source state (steps S401 and S602).

The second actuating time period TP2 is stored in the memory 12M as the actuating time period TP if the electric power source PS is in the second power-source state (steps S401 and S603). The second number of times N2 is stored in the memory 12M as the determination number of times NT if the electric power source PS is in the second power-source state (steps S401 and S603).

The steps S5 to S15 and S216 shown in FIG. 26 are executed by the controller 512 if the controller 512 receives the first control signal CS1. The steps S25 to 35 shown in FIG. 17 are executed by the controller 512 if the controller 512 receives the second control signal CS2 in the step S401 of FIG. 26. The description regarding the steps S5 to S15 and S216 described in the first embodiment can be utilized as the description regarding the steps S5 to S15 and S216 shown in FIG. 26. The description regarding the steps S5 to S15 and S216 described in the first embodiment can be utilized as the description regarding the steps S25 to S35 and S236 shown in FIG. 17, which are continued from the step S401 of FIG. 26, by replacing "first actuating direction D11" with "second actuating direction D12." Thus, the steps S25 to S35 will not be described in detail here for the sake of brevity.

Seventh Embodiment

A control device 710 in accordance with a seventh embodiment will be described below referring to FIGS. 27 and 28. The control device 710 has the same structure and/or configuration as those of the control device 410 except for the controller 412. Thus, elements having substantially the same function as those in the first to fourth embodiments will be numbered the same here and will not be described and/or illustrated again in detail here for the sake of brevity.

Figure 27:
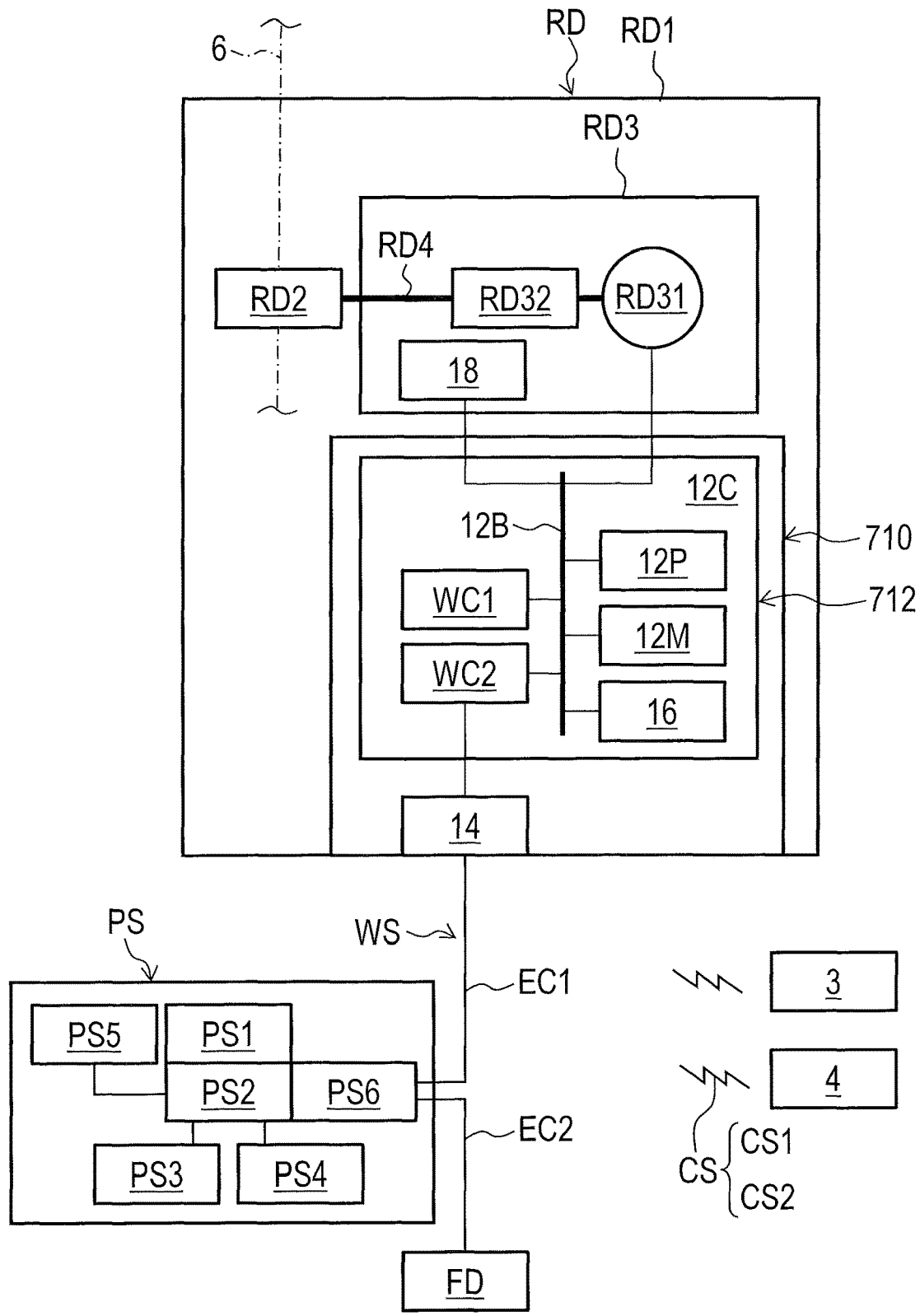
FIG. 27 is a schematic block diagram of a derailleur including a control device in accordance with a seventh embodiment.

As seen in FIG. 27, the control device 710 for the human-powered vehicle 2 comprises a controller 712. The controller 712 is configured to control the actuator RD3 to move the output member RD4 based on the control information. The controller 712 has substantially the same structure as the structure of the controller 412 described in the fourth embodiment.

Figure 28:
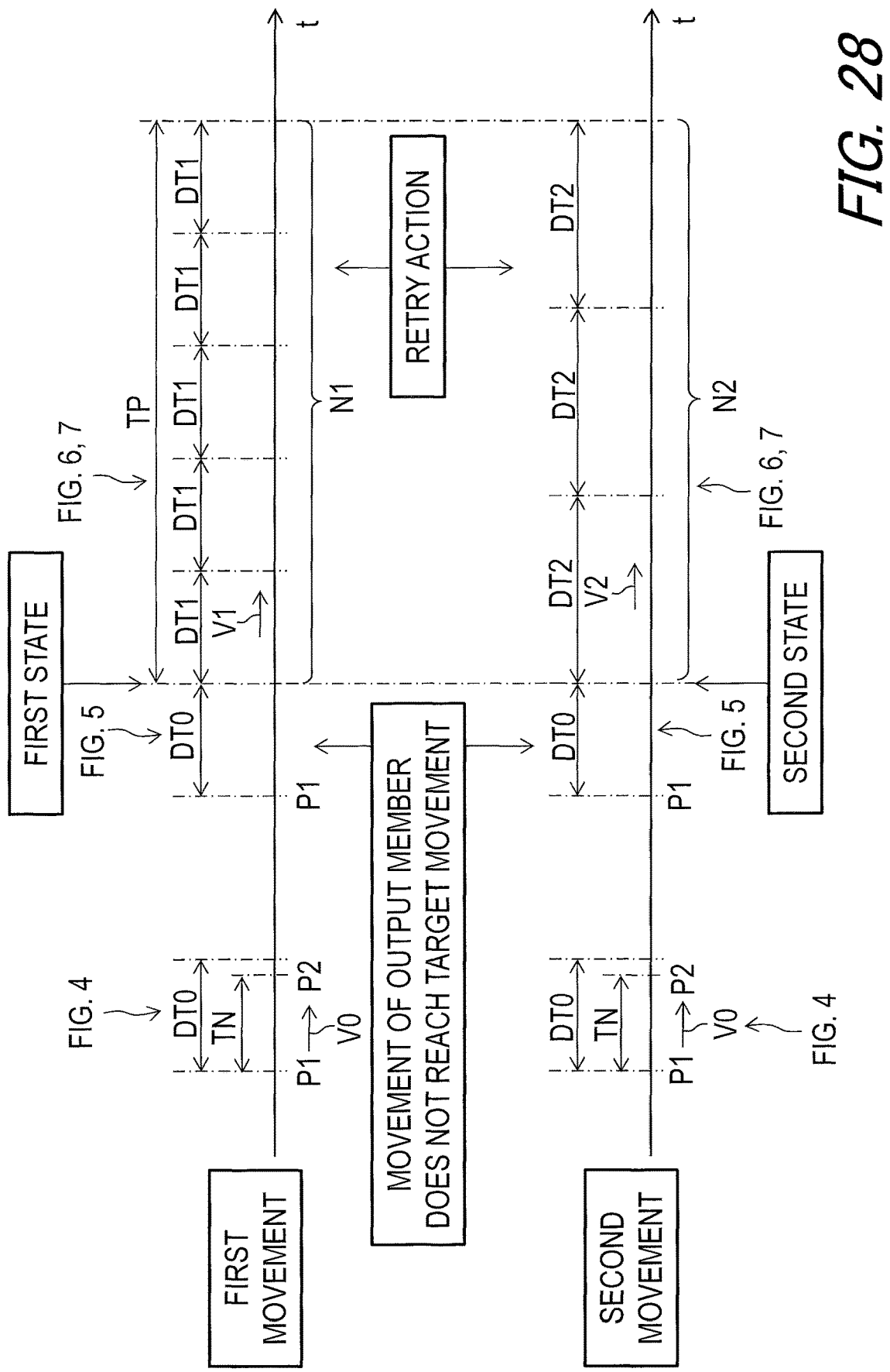
FIG. 28 is a schematic view showing an actuating manner of an actuator of the derailleur illustrated in FIG. 27 in each of a first state and a second state.

As seen in FIG. 28, the controller 712 is configured to control the actuator RD3 to move the output member RD4 in a first actuating manner in a first device state where the control information indicates a first movement of the actuator RD3 and where the movement of the output member RD4 does not reach the target movement after the controller 712 controls the actuator RD3 based on the control information. The first device state can also be referred to as a fifth state.

The controller 712 is configured to control the actuator RD3 to move the output member RD4 in a second actuating manner different from the first actuating manner in a second device state where the control information indicates a second movement of the actuator RD3 and where the movement of the output member RD4 does not reach the target movement after the controller 712 controls the actuator RD3 based on the control information. The second device state can also be referred to as a sixth state.

The first movement has first actuating force. The second movement has second actuating force different from the first actuating force. In the first movement, the actuator RD3 moves the output member RD4 in the first actuating direction D11. In the second movement, the actuator RD3 moves the output member RD4 in the second actuating direction D12. However, the first movement and the second movement can include other movements of the actuator RD3 if needed and/or desired.

As described in the fourth embodiment, the actuator RD3 presses the chain 6 against one of the sprockets RS1 to RS12 to facilitate the gear changing when the actuator RD3 moves the output member RD4 in the second actuating direction D12. Thus, the second actuating force of the second movement is larger than the first actuating force of the first movement. However, the second actuating force of the second movement can be smaller than or equal to the first actuating force of the first movement if needed and/or desired.

The controller 712 is configured to determine whether the control information indicates the first movement or the second movement based on the control signal CS. The controller 712 is configured to determine that the control information indicates the first movement if the controller 712 receives the first control signal CS1. The controller 712 is configured to determine that the control information indicates the second movement if the controller 712 receives the second control signal CS2. Thus, at least one of the flowcharts shown in FIGS. 20, 23, and 26 can be applied to the control of the control device 710. They will not be described in detail here for the sake of brevity.

In the first to seventh embodiments and the modifications thereof, the operating device 4 is configured to transmit the control information to each of the control devices 10 to 710. However, at least one of the control devices 10 to 710 can be configured to generate the control information based on information relating to the human-powered vehicle if needed and/or desired. Namely, at least one of the control devices 10 to 710 can be applied to an automatic gear-changing system of the human-powered vehicle if needed and/or desired.

In the first, third, fourth, and sixth embodiments, the first number of times N1 is five, and the second number of times N2 is three. In the second and fifth embodiments, the determination number of times NT is three. However, the first number of times N1 is not limited to five. The second number of times N2 is not limited to three. The determination number of times NT is not limited to three. The same modifications can be applied to the seventh embodiment.

In the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present disclosure are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present disclosure can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A control device for a human-powered vehicle, the control device comprising:
    a controller configured to control an actuator to move an output member based on control information,
    the controller being configured to control the actuator to move the output member in a first actuating manner in a first state where an electric power source configured to supply electricity to the actuator is in a first power-source state and where a movement of the output member does not reach a target movement after the controller controls the actuator based on the control information, and
    the controller being configured to control the actuator to move the output member in a second actuating manner different from the first actuating manner in a second state where the electric power source is in a second power-source state different from the first power-source state and where the movement of the output member does not reach the target movement after the controller controls the actuator based on the control information.

2. The control device according to claim 1, wherein
    the controller is configured to control the actuator to move the output member at first number of times during an actuating time period in the first state, and
    the controller is configured to control the actuator to move the output member at second number of times different from the first number of times during the actuating time period in the second state.

3. The control device according to claim 2, wherein
    the electric power source has a first remaining level if the electric power source is in the first power-source state,
    the electric power source has a second remaining level if the electric power source is in the second power-source state,
    the second remaining level is lower than the first remaining level, and
    the second number of times is smaller than the first number of times.

4. The control device according to claim 2, wherein
    the electric power source has a first capacity if the electric power source is in the first power-source state,
    the electric power source has a second capacity if the electric power source is in the second power-source state,
    the second capacity is smaller than the first capacity, and
    the second number of times is smaller than the first number of times.

5. The control device according to claim 2, wherein
    the actuating time period in the first state is equal to the actuating time period in the second state.

6. The control device according to claim 1, wherein
    the controller is configured to control the actuator to move the output member during a first actuating time period in the first state, and
    the controller is configured to control the actuator to move the output member during a second actuating time period different from the first actuating time period in the second state.

7. The control device according to claim 6, wherein
    the electric power source has a first remaining level if the electric power source is in the first power-source state,
    the electric power source has a second remaining level if the electric power source is in the second power-source state,
    the second remaining level is lower than the first remaining level, and
    the second actuating time period is shorter than the first actuating time period.

8. The control device according to claim 6, wherein
    the electric power source has a first capacity if the electric power source is in the first power-source state,
    the electric power source has a second capacity if the electric power source is in the second power-source state,
    the second capacity is smaller than the first capacity, and
    the second actuating time period is shorter than the first actuating time period.

9. The control device according to claim 2, wherein
    the actuating time period includes a first actuating time period and a second actuating time period different from the first actuating time period,
    the controller is configured to control the actuator to move the output member at the first number of times during the first actuating time period in the first state, and
    the controller is configured to control the actuator to move the output member at the second number of times during the second actuating time period in the second state.

10. The control device according to claim 9, wherein
    the electric power source has a first capacity if the electric power source is in the first power-source state,
    the electric power source has a second capacity if the electric power source is in the second power-source state,
    the second capacity is smaller than the first capacity, and
    the second actuating time period is shorter than the first actuating time period.

11. A control device for a human-powered vehicle, the control device comprising:
    a controller configured to control an actuator to move an output member based on control information,
    the controller being configured to control the actuator to move the output member in a first actuating manner in a first actuator state where the control information indicates a first actuating direction of the actuator and where a movement of the output member does not reach a target movement after the controller controls the actuator based on the control information, and the controller being configured to control the actuator to move the output member in a second actuating manner different from the first actuating manner in a second actuator state where the control information indicates a second actuating direction of the actuator different from the first actuating direction and where the movement of the output member does not reach the target movement after the controller controls the actuator based on the control information.

12. The control device according to claim 11, wherein the controller is configured to control the actuator to move the output member at first number of times during an actuating time period in the first actuator state, and the controller is configured to control the actuator to move the output member at second number of times different from the first number of times during the actuating time period in the second actuator state.

13. The control device according to claim 12, wherein the first actuating direction is a direction in which power consumption of the actuator is first power consumption, the second actuating direction is a direction in which the power consumption of the actuator is second power consumption higher than the first power consumption, and the second number of times is smaller than the first number of times.

14. The control device according to claim 12, wherein the actuating time period in the first actuator state is equal to the actuating time period in the second actuator state.

15. The control device according to claim 12, wherein the actuating time period includes a first actuating time period and a second actuating time period different from the first actuating time period, the controller is configured to control the actuator to move the output member at the first number of times during the first actuating time period in the first actuator state, and the controller is configured to control the actuator to move the output member at the second number of times during the second actuating time period in the second actuator state.

16. The control device according to claim 15, wherein the first actuating direction is a direction in which power consumption of the actuator is first power consumption, the second actuating direction is a direction in which the power consumption of the actuator is second power consumption higher than the first power consumption, and the second actuating time period is shorter than the first actuating time period.

17. The control device according to claim 11, wherein the controller is configured to control the actuator to move the output member during a first actuating time period in the first actuator state, and the controller is configured to control the actuator to move the output member during a second actuating time period different from the first actuating time period in the second actuator state.

18. The control device according to claim 17, wherein the first actuating direction is a direction in which power consumption of the actuator is first power consumption, the second actuating direction is a direction in which the power consumption of the actuator is second power consumption higher than the first power consumption, and the second actuating time period is shorter than the first actuating time period.

19. The control device according to claim 1, wherein the controller is configured to determine whether the electric power source is in the first power-source state or in the second power-source state based on at least one of a voltage, a current, and a temperature of the electric power source.

20. A control device for a human-powered vehicle, the control device comprising:

a controller configured to control an actuator to move an output member based on control information, the controller being configured to control the actuator to move the output member in a first actuating manner in a first device state where the control information indicates a first movement of the actuator and where a movement of the output member does not reach a target movement after the controller controls the actuator based on the control information, and the controller being configured to control the actuator to move the output member in a second actuating manner different from the first actuating manner in a second device state where the control information indicates a second movement of the actuator and where the movement of the output member does not reach the target movement after the controller controls the actuator based on the control information, the first movement having first actuating force, and the second movement having second actuating force different from the first actuating force.

21. A derailleur for a human-powered vehicle, the derailleur comprising:

a base;

a movable member movably coupled to the base;

the control device according to claim 1;

the actuator including the output member, the actuator being configured to move the output member using electricity supplied from the electric power source; and a detector configured to detect actuating information relating to the movement of the output member, the actuator being coupled to the movable member to move the movable member relative to the base using the electricity supplied from the electric power source, and the detector being configured to detect a movement of the movable member relative to the base as the actuating information.

\* \* \* \* \*